US010849160B2

(12) United States Patent
Turtinen et al.

(10) Patent No.: US 10,849,160 B2
(45) Date of Patent: Nov. 24, 2020

(54) REINSTATING POLL RETRANSMISSION TIMER

(71) Applicant: NOKIA TECHNOLOGIES OY, Espoo (FI)

(72) Inventors: Samuli Heikki Turtinen, Ii (FI); Esa Mikael Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/286,222

(22) Filed: Feb. 26, 2019

(65) Prior Publication Data

US 2020/0275481 A1    Aug. 27, 2020

(51) Int. Cl.
*H04W 74/06* (2009.01)
*H04L 1/18* (2006.01)

(52) U.S. Cl.
CPC .............. *H04W 74/06* (2013.01); *H04L 1/18* (2013.01)

(58) Field of Classification Search
CPC ........... H04L 1/18; H04L 1/188; H04W 74/06
See application file for complete search history.

(56) References Cited

U.S. PATENT DOCUMENTS

| 7,646,742 | B2 * | 1/2010 | Petrovic | H04L 1/1835 |
| | | | | 370/328 |
| 7,870,259 | B2 * | 1/2011 | Meyer | H04L 1/1685 |
| | | | | 370/231 |
| 8,201,041 | B2 * | 6/2012 | Lin | H04L 1/0025 |
| | | | | 714/748 |
| 8,488,523 | B2 * | 7/2013 | Chun | H04W 74/06 |
| | | | | 370/328 |

(Continued)

FOREIGN PATENT DOCUMENTS

| WO | WO-2010069206 A1 * | 6/2010 | ........... H04L 1/1685 |
| WO | WO-2012000312 A1 * | 1/2012 | ........... H04L 1/1685 |
| WO | WO-2019193448 A1 * | 10/2019 | ........... H04L 1/1642 |

OTHER PUBLICATIONS

3GPP TS 38.322 V15.4.0; 3rd Generation Partnership Project; Technical Specification Group Radio Access Network; NR; Radio Link Control (RLC) protocol specification (Release 15); Sophia Antipolis, France; Dec. 2018; 33 pages.

(Continued)

*Primary Examiner* — Eric Nowlin

(74) *Attorney, Agent, or Firm* — Brake Hughes Bellermann LLP

(57) ABSTRACT

A method can include sending, by a first wireless node to a second wireless node, multiple packets, the multiple packets being associated with multiple sequence numbers; sending a poll to the second wireless node, the poll requesting indications of whether the multiple packets were successfully received; setting a polling sequence number to a highest sequence number associated with the multiple packets sent by the first wireless node when the first wireless node sent the poll; starting a poll retransmission timer; receiving a status report from the second wireless node, the status report including a negative acknowledgment sequence number and an acknowledgment sequence number, the negative acknowledgment sequence number being greater than the acknowledgment sequence number; and based on the negative acknowledgment sequence number being equal to or greater than the polling sequence number, reinstating the poll retransmission timer.

21 Claims, 18 Drawing Sheets

(56) References Cited

U.S. PATENT DOCUMENTS

| | | | | |
|---|---|---|---|---|
| 8,958,411 B2* | 2/2015 | Chun | H04L 1/1685 | 370/346 |
| 9,461,776 B2* | 10/2016 | Celik | H04L 1/1685 | |
| 9,900,798 B2* | 2/2018 | Bergquist | H04W 74/06 | |
| 9,930,694 B2* | 3/2018 | Koskinen | H04L 1/08 | |
| 2004/0148396 A1* | 7/2004 | Meyer | H04L 1/1685 | 709/227 |
| 2006/0251105 A1* | 11/2006 | Kim | H04L 1/189 | 370/449 |
| 2009/0049356 A1* | 2/2009 | Lin | H04L 1/0029 | 714/749 |
| 2010/0128669 A1* | 5/2010 | Chun | H04W 88/06 | 370/328 |
| 2010/0177701 A1* | 7/2010 | Maheshwari | H04L 1/1883 | 370/328 |
| 2011/0019756 A1* | 1/2011 | Chun | H04L 1/188 | 375/260 |
| 2011/0170491 A1* | 7/2011 | Shinohara | H04L 47/34 | 370/328 |
| 2013/0194933 A1* | 8/2013 | Celik | H04L 1/1685 | 370/242 |
| 2016/0150433 A1* | 5/2016 | Bergquist | H04W 24/10 | 370/328 |
| 2016/0150522 A1* | 5/2016 | Kanamarlapudi | H04L 1/1874 | 370/329 |
| 2017/0290055 A1* | 10/2017 | Koskinen | H04L 43/0858 | |
| 2018/0288732 A1* | 10/2018 | Balasubramaniam | H04L 1/1642 | |
| 2019/0150021 A1* | 5/2019 | Sugaya | H04W 28/04 | 370/230 |
| 2019/0208541 A1* | 7/2019 | Lee | H04L 1/187 | |
| 2019/0253921 A1* | 8/2019 | Shin | H04L 1/188 | |
| 2020/0059324 A1* | 2/2020 | Martin | H04W 72/1284 | |
| 2020/0107394 A1* | 4/2020 | Lee | H04L 1/189 | |

OTHER PUBLICATIONS

3GPP TR 38.874 V16.0.0; 3rd Generation Partnership Project; Technical Specification Group Radio Access Network; NR; Study on Integrated Access and Backhaul; (Release 16); Sophia Antipolis, France; Dec. 2018; 111 pages.

* cited by examiner

Upon reception of a STATUS report from the receiving RLC AM entity the transmitting side of an AM RLC entity shall:

- if the STATUS report comprises a positive or negative acknowledgement for the RLC SDU with sequence number equal to POLL_SN:
  - if *t-PollRetransmit* is running:
    - stop and reset *t-PollRetransmit*.
- else if the STATUS report comprises a negative acknowledgement for the RLC SDU with sequence number higher than POLL_SN:
  - start or restart *t-PollRetransmit*.

FIG. 10A.1

When constructing a STATUS PDU, the AM RLC entity shall:

- for the RLC SDUs with SN such that RX_Next <= SN < RX_Highest_Status that has not been completely received yet, in increasing SN order of RLC SDUs and increasing byte segment order within RLC SDUs, starting with SN = RX_Next up to the point where the resulting STATUS PDU still fits to the total size of RLC PDU(s) indicated by lower layer:

- for an RLC SDU for which no byte segments have been received yet:
    - include in the STATUS PDU a NACK_SN which is set to the SN of the RLC SDU.
  - for a continuous sequence of byte segments of a partly received RLC SDU that have not been received yet:
    - include in the STATUS PDU a set of NACK_SN, SOstart and SOend.
  - for a continuous sequence of RLC SDUs that have not been received yet:
    - include in the STATUS PDU a set of NACK_SN and NACK range;
    - include in the STATUS PDU, if required, a pair of SOstart and SOend.
- set the ACK_SN to the SN of the next not received RLC SDU which is not indicated as missing in the resulting STATUS PDU.
- if RLC SDU or RLC SDU segment with a poll has been received with SN = x such that ACK_SN <= x < RX_Next + AM_Window_Size:
  - include in the STATUS PDU a NACK_SN = x, SOstart with value "1111111111111111" and SOend with value "0000000000000000".

FIG. 10B.1

REINSTATING POLL RETRANSMISSION TIMER

TECHNICAL FIELD

This description relates to wireless networking.

BACKGROUND

In multi-hop wireless networks, some packets may not be successfully transmitted between nodes. Communications indicating whether or not packets were successfully received can reduce the data rate available for packets.

SUMMARY

According to an example, a method can include sending, by a first wireless node to a second wireless node, multiple packets, the multiple packets being associated with multiple sequence numbers; sending a poll to the second wireless node, the poll requesting indications of whether the multiple packets were successfully received; setting a polling sequence number to a highest sequence number associated with the multiple packets sent by the first wireless node when the first wireless node sent the poll; starting a poll retransmission timer; receiving a status report from the second wireless node, the status report including a negative acknowledgment sequence number and an acknowledgment sequence number, the negative acknowledgment sequence number being greater than the acknowledgment sequence number; and based on the negative acknowledgment sequence number being equal to or greater than the polling sequence number, reinstating the poll retransmission timer.

According to an example, a method can include sending, by a first wireless node to a second wireless node, multiple packets, the multiple packets being associated with multiple sequence numbers; and receiving, from the second wireless node, a protocol sequence number, the protocol sequence number indicating a highest sequence number of packets received by a third wireless node, the third wireless node being subordinate to the second wireless node.

According to an example, a user equipment can include at least one processor and a non-transitory computer-readable storage medium. The non-transitory computer-readable storage medium can comprise instructions stored thereon that, when executed by the at least one processor, are configured to cause the user equipment to send, to an intermediate node, multiple packets, the multiple packets being associated with multiple sequence numbers; send a poll to the intermediate node, the poll requesting indications of whether the multiple packets were successfully received; set a polling sequence number to a highest sequence number associated with the multiple packets sent by the user equipment when the user equipment sent the poll; start a poll retransmission timer; receive a status report from the intermediate node, the status report including a negative acknowledgment sequence number and an acknowledgment sequence number, the negative acknowledgment sequence number being greater than the acknowledgment sequence number; and based on the negative acknowledgment sequence being equal to or greater than the polling sequence number, reinstate the poll retransmission timer.

According to an example, a user equipment can include at least one processor and a non-transitory computer-readable storage medium. The non-transitory computer-readable storage medium can comprise instructions stored thereon that, when executed by the at least one processor, are configured to cause the user equipment to send, to a first intermediate node, multiple packets, the multiple packets being associated with multiple sequence numbers; and receive, from the first intermediate node, a protocol sequence number, the protocol sequence number indicating a highest sequence number of packets that can be indicated to upper layers as successfully delivered.

According to an example, a non-transitory computer-readable storage medium can comprise instructions stored thereon that, when executed by the at least one processor, are configured to cause a user equipment to send, to an intermediate node, multiple packets, the multiple packets being associated with multiple sequence numbers; send a poll to the intermediate node, the poll requesting indications of whether the multiple packets were successfully received; set a polling sequence number to a highest sequence number associated with the multiple packets sent by the user equipment when the user equipment sent the poll; start a poll retransmission timer; receive a status report from the intermediate node, the status report including a negative acknowledgment sequence number and an acknowledgment sequence number, the negative sequence number being greater than the acknowledgment sequence number; and based on the negative acknowledgment sequence number being equal to or greater than the polling sequence number, reinstate the poll retransmission timer.

According to an example, a non-transitory computer-readable storage medium can comprise instructions stored thereon that, when executed by the at least one processor, are configured to cause a user equipment to send, to a first intermediate node, multiple packets, the multiple packets being associated with multiple sequence numbers; and receive, from the first intermediate node, a protocol sequence number, the protocol sequence number indicating a highest sequence number of packets that can be indicated to upper layers as successfully delivered.

According to an example, a method can include receiving, by an intermediate node from a user equipment, multiple packets, the multiple packets being associated with multiple sequence numbers; receiving a poll from the user equipment, the poll requesting indications of whether the multiple packets were successfully received; and sending a status report to the user equipment, the status report including a negative acknowledgment sequence number, an acknowledgment sequence number, and an indicator, the negative acknowledgment sequence number being greater than the acknowledgment sequence number, the indicator indicating that a packet with a sequence number equal to the negative acknowledgment sequence number should not be retransmitted.

According to an example, a non-transitory computer-readable storage medium can comprise instructions stored thereon that, when executed by at least one processor, are configured to cause an intermediate node to receive, from a user equipment, multiple packets, the multiple packets being associated with multiple sequence numbers; receive a poll from the user equipment, the poll requesting indications of whether the multiple packets were successfully received; and send a status report to the user equipment, the status report including a negative acknowledgment sequence number, an acknowledgment sequence number, and an indicator, the negative acknowledgment sequence number being greater than the acknowledgment sequence number, the indicator indicating that a packet with a sequence number equal to the negative acknowledgment sequence number should not be retransmitted.

According to an example, an intermediate node can include at least one processor and a non-transitory computer-readable storage medium comprising instructions stored thereon that, when executed by the at least one processor, are configured to cause an intermediate node to receive, from a user equipment, multiple packets, the multiple packets being associated with multiple sequence numbers; receive a poll from the user equipment, the poll requesting indications of whether the multiple packets were successfully received; and send a status report to the user equipment, the status report including a negative acknowledgment sequence number, an acknowledgment sequence number, and an indicator, the negative acknowledgment sequence number being greater than the acknowledgment sequence number, the indicator indicating that a packet with a sequence number equal to the negative acknowledgment sequence number should not be retransmitted.

The details of one or more implementations are set forth in the accompanying drawings and the description below. Other features will be apparent from the description and drawings, and from the claims.

BRIEF DESCRIPTION OF THE DRAWINGS

FIG. 10A.1 shows an example protocol.

FIG. 10B.1 shows an example protocol.

DETAILED DESCRIPTION

Figure 1:
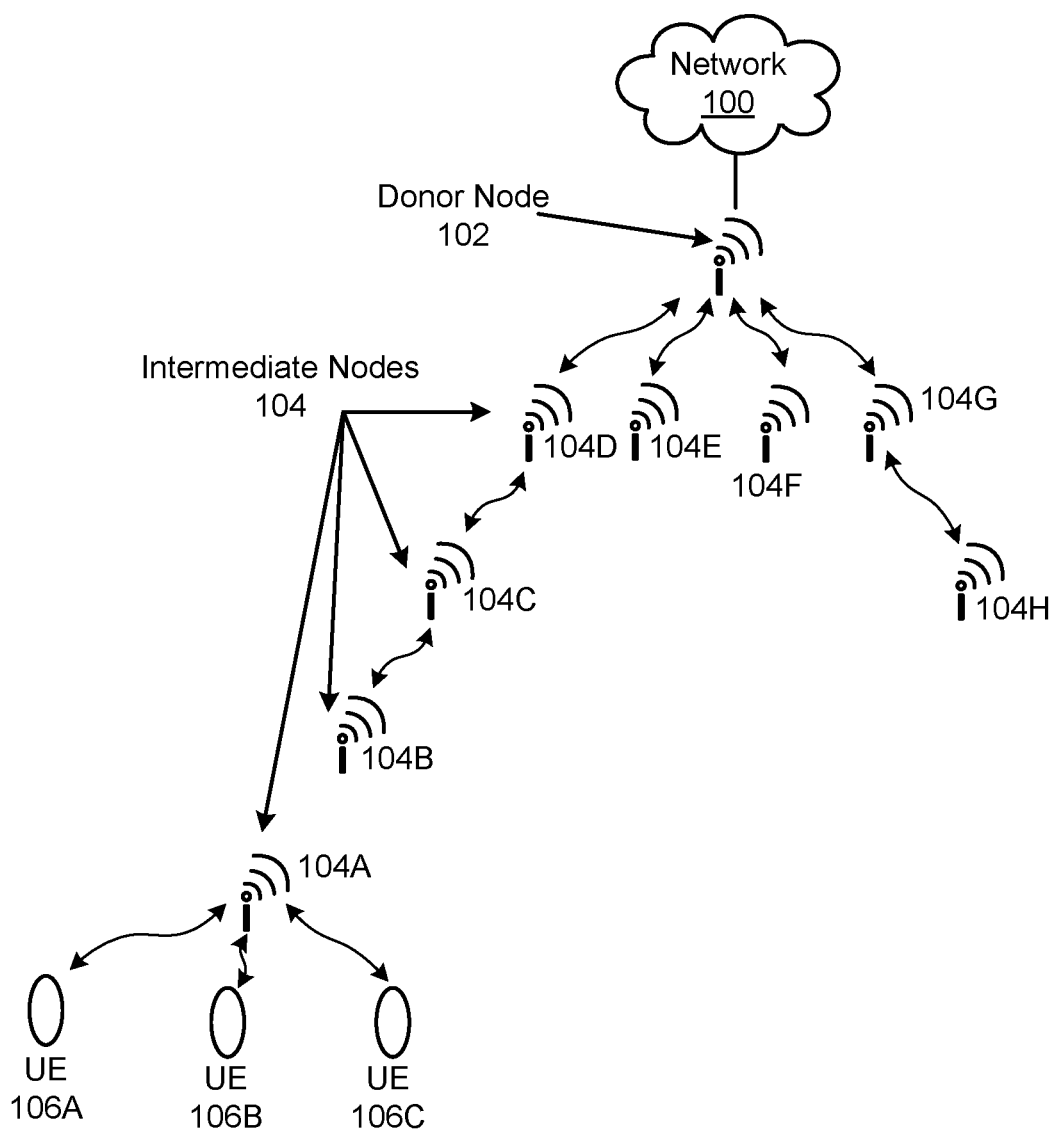
FIG. 1 is a network diagram showing intermediate nodes, a donor node, a backhaul network, and user equipments according to an example embodiment.

FIG. 1 is a network diagram showing intermediate nodes 104A, 104B, 104C, 104D, 104E, 104F, 104G, 104H, a donor node 102, a backhaul network 100, and user equipments 106A, 106B, 106C according to an example embodiment. The backhaul network may be a wired infrastructure network that services wireless nodes, such as base stations. The donor node 102, which may be considered a donor next generation Node B (donor gNB), may have a wired and/or fixed connection and/or communication interface with the network 100. Some intermediate nodes 104D, 104E, 104F, 104G, which may be considered Integrated Access and Backhaul (IAB) nodes and/or may serve as relay nodes to extend the reach of the wireless network, may be in direct, wireless communication with the donor node 102. Some intermediate nodes 104A, 104B, 104C, 104D, 104E, 104G, 104G, 104H (referred to generically as intermediate nodes 104) may be in wireless communication with other intermediate nodes 104. Some intermediate nodes 104 may be in wireless communication with user equipments (UEs) 106A, 106B, 106C. The UEs 106A, 106B, 106C may include cellphones, tablets, laptop computers, or any computing device capable of wirelessly sending and receiving signals to and from intermediate nodes 104. Packets may travel between the UEs 106A, 106B, 106C (and other UEs not shown in FIG. 1) and the network 100 via the intermediate nodes 104. In some examples, the packets can be considered radio link control (RLC) service data units (SDUs).

As used herein, a "superordinate node" may be a node from which a signal, which may be in a form of a packet, was sent and/or originated and/or to which a source node transmits data directly in the direction of, or on a path toward, a destination node. A "subordinate node" may be a node toward which a signal, which may be in a form of a packet, is sent, and/or to which a source node transmits data directly in the direction of, or on a path toward. A "source" may be an end node initiating transmission, which may be either a UE 106A, 106B, 106C in the uplink direction or the donor node 102 (or network 100) in the downlink transmission. A "destination" may be an end node where a packet is intended to exit the multi-hop network, such as the UE 106A, 106B, 106C in downlink transmission or the donor node 102 in uplink transmission. Source and destination nodes are characterized in view of a single automatic repeat request (ARQ) process. As such, packets subject to an uplink (UL) ARQ process between UE 106A and DgNB 102 may travel further than the DgNB destination node, for example UL packets may be sent into network 100 and may originate from further than the UE 106A source node, for example packets arriving at UE 106A from a peripheral apparatus (not shown) connected to UE 106A. Since each IAB node may comprise a UE/MT (mobile termination) part communicating with a parent node Radio Access Network (RAN)/Distributed Unit (DU) part, and RAN/DU part communicating with the child node UE/MT part, the source or destination node can also be an IAB node, especially for any traffic terminating in the IAB node, such as control signaling controlling the IAB node.

In an example in which the donor node 102 is a source and the UE 106A is a destination, such as when a signal is sent from the network 100 to UE 106A, the intermediate nodes 104A, 104B, 104C, 104D, and UE 106A are subordinate nodes with respect to the donor node 102, the intermediate nodes 104A, 104B, 104C, and UE 106A are subordinate nodes with respect to the intermediate node 104D, the intermediate nodes 104A, 104B, and UE 106A are subordinate nodes with respect to the intermediate node 104C, the intermediate node 104A and UE 106A are subordinate nodes with respect to the intermediate node 104B, and the UE 106A is a subordinate node with respect to the intermediate node 104A. In this example in which a signal is sent from the network 100 to UE 106A, the donor node 102 may be a superordinate node with respect to the intermediate nodes 104A, 104B, 104C, 104D, and UE 106A, the intermediate node 104D may be a superordinate node with respect to the intermediate nodes 104A, 104B, 104C, and UE, the intermediate node 104C may be a superordinate node with respect to the intermediate nodes 104A, 104B, and UE 106A, the intermediate node 104B may be a superordinate node with respect to the intermediate node 104A and UE 106A, and the intermediate node 104 may be a superordinate node with respect to the UE 106A.

In an example in which the UE 106A is a source and the donor node is a destination, such as when a signal is sent from the UE 106A to the network 100 via the donor node 102, the intermediate nodes 104A, 104B, 104C, 104D, and UE 106A are superordinate nodes with respect to the donor node 102, the intermediate nodes 104A, 104B, 104C, and UE 106A are superordinate nodes with respect to the intermediate node 104D, the intermediate nodes 104A, 104B, and UE 106A are superordinate nodes with respect to the intermediate node 104C, the intermediate node 104A and UE 106A are superordinate nodes with respect to the intermediate node 104B, and the UE 106A is a superordinate node with respect to the intermediate node 104A. In this example in which a signal is sent from the UE 106A to the network 100 via the donor node 102, the donor node 102 may be a subordinate node with respect to the intermediate nodes 104A, 104B, 104C, 104D, and UE 106A, the intermediate node 104D may be a subordinate node with respect to the intermediate nodes 104A, 104B, 104C, and UE 106A, the intermediate node 104C may be a subordinate node with respect to the intermediate nodes 104A, 104B, and UE 106A, the intermediate node 104B may be a subordinate node with respect to the intermediate node 104A and UE 106A, and the intermediate node 104A may be a subordinate node with respect to the UE 106A.

While the terminology of Fifth-Generation (5G) New Radio (NR) is used herein, the techniques, methods, and/or functions described herein may be applied to any wireless network with intermediate and/or relay nodes.

In some examples, the intermediate nodes 104 can receive packets from a superordinate node, store the packets in a buffer of the respective intermediate node 104, and forward the packets to a subordinate node. Upon reception of a negative acknowledgment (NACK) (indicating failure to successfully receive and/or unsuccessful receipt) of a packet from a subordinate node, the intermediate node 104 can determine whether the packet that was negatively acknowledged is stored in the buffer of the intermediate node 104. The negative acknowledgment can include a sequence number, which can be considered a negative acknowledgment sequence number (which can be represented as NACK_SN), identifying the sequence number of the packet that is negatively acknowledged, which was not successfully received and/or which was unsuccessfully received. If the packet that was negatively acknowledged is stored in the buffer of the intermediate node 104, then the intermediate node 104 can forward and/or re-send the packet to the subordinate node that negatively acknowledged the packet. If the packet that was negatively acknowledged is not stored in the buffer of the intermediate node 104, then the intermediate node 104 can send the negative acknowledgment, and/or a new negative acknowledgment, to a superordinate node of the intermediate node 104. The intermediate node 104 can delete and/or erase packets from the buffer of the intermediate node in response to receiving acknowledgments (ACKs) (indicating successful receipt) of the packets, or can store packets until the buffer is full and then delete and/or erase packets that were earliest received and/or acknowledged.

In some examples, intermediate nodes 104, user equipments 106A, and/or the donor node 102, can generate status reports that include the acknowledgments and negative acknowledgments. In some examples, the superordinate node can send a poll to the subordinate node. The poll can request indications of whether sent and/or transmitted packets were successfully received. In some examples, the poll can prompt the subordinate node to respond to the poll with a status report indicating whether sent and/or transmitted packets were successfully received.

In some examples, the status report can include a sequence number subsequent to a highest sequence number of successfully received packets (which can be considered an acknowledgment sequence number), and/or a sequence number of a next not-received packet which is not indicated as missing (which can also be considered an acknowledgment sequence number). This acknowledgment sequence number (which can be represented as ACK_SN) can indicate that packets with sequence numbers lower than the sequence number were acknowledged and/or successfully received, unless the status report includes a specific negative acknowledgment of the packets. The status report can also include zero, one, two, or any number of sequence numbers of negatively acknowledged packets. In some examples, the sequence numbers of negatively acknowledged packets must be lower than the sequence number indicating acknowledged and/or successfully received packets. In some examples, a status report with a negative acknowledgment sequence number greater than an acknowledgment sequence number, and a polling sequence number (which can be represented as POLL_SN) that is less than or equal to the acknowledgment sequence number, can prompt a node to reinstate the poll retransmission timer.

In some examples, the status report received from a subordinate node can include a received acknowledgment sequence number, which may be denoted $ACK\_SN_r$. The status report can also include sequence numbers of, and/or indications of, any individually negatively acknowledged packets with sequence numbers below the sequence number of $ACK\_SN_r$. In some examples, the status report can also include sequence numbers of, and/or indications of, negatively acknowledged packets with sequence numbers above the sequence number of $ACK\_SN_r$.

In some examples, the intermediate node 104 can determine a transmit acknowledgment sequence number, which may be denoted $ACK\_SN_r$, indicating an earliest packet that the superordinate node does not need to retransmit and/or re-send, as the lowest sequence number of the individual packets that were negatively acknowledged, have a sequence number less than $ACK\_SN_r$, and are stored in the buffer. If no packets were negatively acknowledged, have a sequence number less than $ACK\_SN_r$, and are stored in the buffer, then $ACK\_SN_t$ will be equal to $ACK\_SN_r$. In these examples, the status report can include $ACK\_SN_t$ and sequence numbers of any individually negatively acknowledged packets that are not stored in the buffer of the intermediate node and have a sequence number less than $ACK\_SN_r$. In some examples, the status report can also include the individually negatively acknowledged packets that are not stored in the buffer of the intermediate node and have a sequence number greater than $ACK\_SN_r$. The intermediate node 104 can transmit, to the subordinate node, any individually negatively acknowledged packets stored in the buffer of the intermediate node 104 with sequence numbers below ACK_SN$_r$. In some examples, the intermediate node 104 can transmit, to the subordinate node, any individually negatively acknowledged packets stored in the buffer of the intermediate node 104 with sequence numbers greater than ACK_SN$_r$. The intermediate node 104 can also transmit and/or send, to the subordinate node, any packets newly received from the superordinate node. In some examples, the intermediate node 104 can remove, delete, and/or erase any packets from the buffer of the intermediate node 104 that have sequence numbers below ACK_SN$_r$ and which were not specifically negatively acknowledged.

In some examples, status reports indicating acknowledged and negatively acknowledged packets can be sent at each hop, as well as end-to-end from the destination to the source.

The techniques, methods, and/or functions described herein of acknowledging, negatively acknowledging, and transmitting and/or re-sending packets ensures that packets reach their destination, and/or are received by the subordinate node, by either re-sending the packet to the subordinate node or negatively acknowledging the packets to superordinate nodes, while reducing the overhead of acknowledgment and negative acknowledgment messages and number of packet retransmissions.

Figure 2:
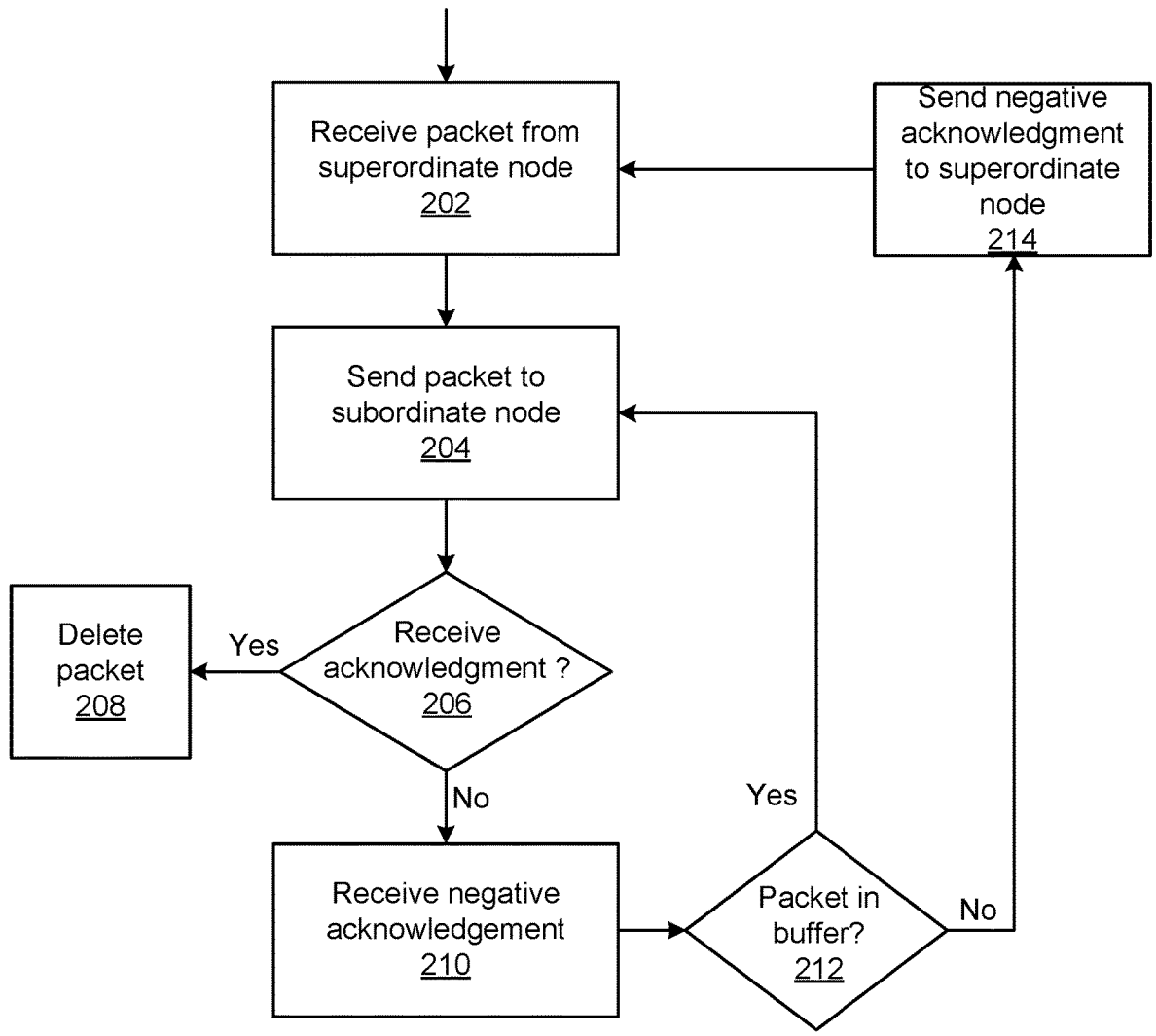
FIG. 2 is a flowchart showing a method performed by an intermediate node according to an example embodiment.

FIG. 2 is a flowchart showing a method performed by an intermediate node 104 according to an example embodiment. In this example, the intermediate node 104 can receive a packet from a superordinate node (202). The intermediate node 104 can send and/or forward the received packet to a subordinate node (204).

The intermediate node 104 can determine whether the intermediate node 104 received an acknowledgment of the packet that the intermediate node 104 sent to the subordinate node (206). An acknowledgment of the packet can be in the form of a sequence number, such as an acknowledgment sequence number, of received packets in the status report that is greater than the sequence number of the acknowledged packet. If the intermediate node 104 did receive an acknowledgment of the packet, then the intermediate node 104 can delete and/or erase the packet from the buffer of the intermediate node 104 (208).

If the intermediate node 104 does not receive an acknowledgment of the packet, then the intermediate node 104 may subsequently receive a negative acknowledgment of the packet from the subordinate node (210), indicating that the subordinate node did not successfully receive the packet. The negative acknowledgment may be in the form of a specific negative acknowledgment of the sequence number of the packet included in a status report, or may be implied by never receiving an acknowledgment sequence number greater than the sequence number of the packet within a retransmission time period and/or before a retransmission timer expires.

Based on, and/or in response to, receiving the negative acknowledgment of the packet, or expiration of the retransmission timer, the intermediate node 104 can determine whether the packet is stored in the buffer of the intermediate node (212). If the packet is stored in the buffer of the intermediate node 104, then the intermediate node 104 can send, re-send, and/or transmit the packet to the subordinate node (204).

If the packet is not stored in the buffer of the intermediate node 104, then the intermediate node 104 can send and/or forward a negative acknowledgment to the superordinate node that originally sent the packet to the intermediate node (214). The negative acknowledgment can be a sequence number, such as a negative acknowledgment sequence number, identifying the packet. In some examples, the negative acknowledgment indicating negative acknowledgment and/or unsuccessful receipt can be included in the status report. In some examples, the lack of receiving a sequence number, such as an acknowledgment sequence number, greater than the sequence number of the packet indicating acknowledgment and/or successful receipt of the packet, within the retransmission time period and/or before the retransmission timer expires, can indicate failure to receive the packet and/or can be considered a negative acknowledgment. Based on the intermediate node 104 sending the negative acknowledgment to the superordinate node, the superordinate node can send, re-send, and/or transmit the packet to the intermediate node, and the intermediate node 104 can receive the packet from the superordinate node (202).

Figure 3:
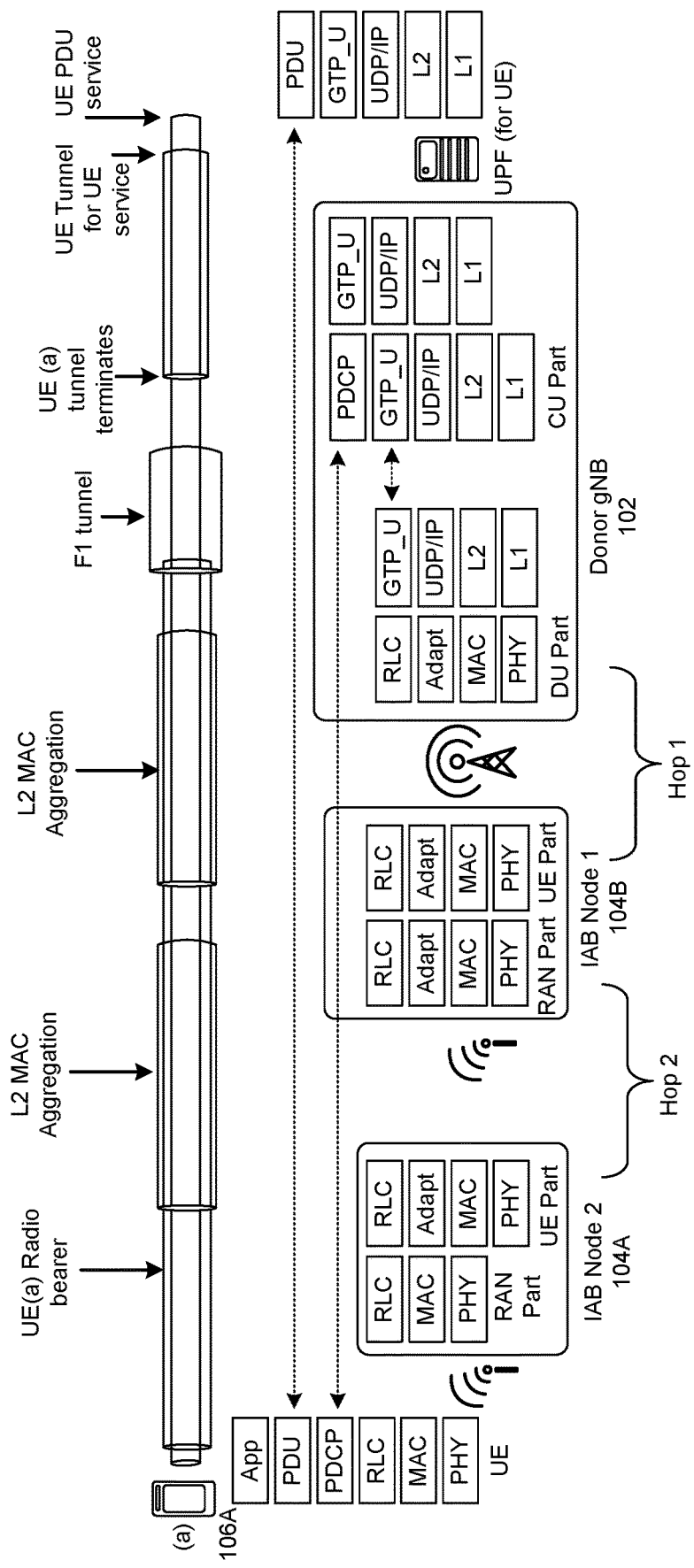
FIG. 3 shows a user plane protocol stack design for a user equipment according to an example embodiment.

FIG. 3 shows a user plane protocol stack design for a user equipment (UE) 106A, 106B, 106C according to an example embodiment. Packets may be transmitted between the donor node 102 and a UE 106A via intermediate nodes 104A, 104B using multiple hops and protocols such as Medium Access Control (MAC), RLC, or Packet Data Convergence Protocol (PDCP) protocols.

Figure 4:
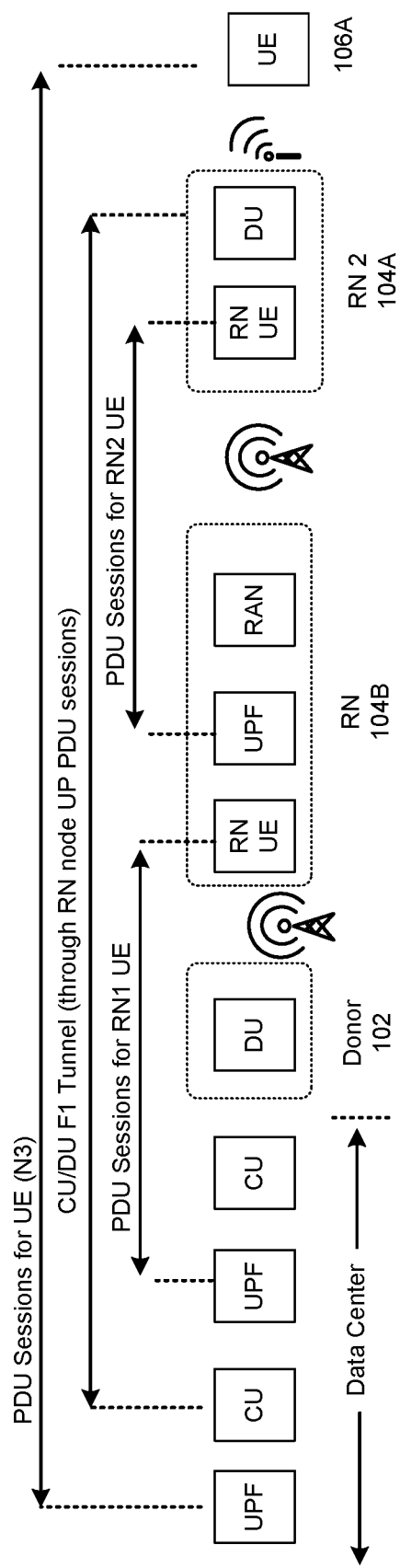
FIG. 4 shows a multi-hop relay according to an example embodiment.

FIG. 4 shows a multi-hop relay according to an example embodiment. Packets may be transmitted between the donor node 102 and a UE 106A via intermediate nodes 104A, 104B using multiple hops during packet data unit (PDU) sessions and/or tunneling.

Figure 5:
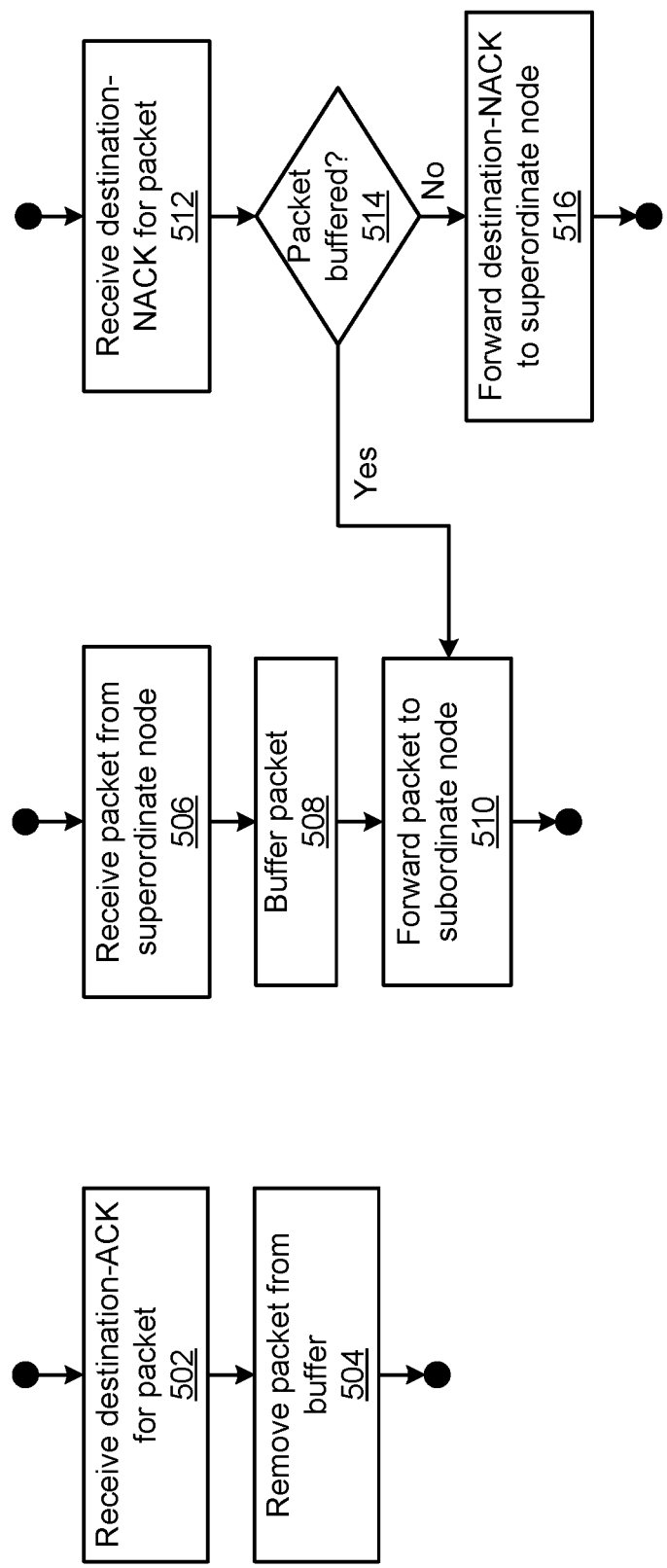
FIG. 5 is a flowchart showing a method performed by an intermediate node according to an example embodiment.

FIG. 5 is a flowchart showing a method performed by an intermediate node 104 according to an example embodiment. In this example, the intermediate node 104 may respond to receiving a destination acknowledgment for a packet (502) by removing, deleting, and/or erasing the packet from the buffer of the intermediate node 104 (504). The destination acknowledgment can be an acknowledgment received directly from a destination node and/or directly from a node that is subordinate to the intermediate node 104 but is not the destination node. The intermediate node 104 can include the destination acknowledgment in a status message.

The method may include the intermediate node 104 receiving a packet from a superordinate node (506), buffering the received packet and/or storing the packet in the buffer of the intermediate node 104 (508), and forwarding and/or sending the packet to a subordinate node (510).

The method may include the intermediate node 104 receiving a destination negative acknowledgment for a packet (512), and/or receiving a destination negative acknowledgment of the packet from a destination node and/or subordinate node. In response to, and/or based on, receiving the destination negative acknowledgment, the method may include the intermediate node 104 determining whether the packet is buffered (514) and/or determining whether the packet is stored in the buffer of the intermediate node 104. If the packet is buffered, then the method may include the intermediate node forwarding and/or sending the packet to a subordinate node (510). If the packet is not buffered, then the method may include the intermediate node 104 forwarding a destination negative acknowledgment to a superordinate node (516), and/or sending a destination negative acknowledgment to a superordinate node, which may prompt the superordinate node to re-send the packet to the intermediate node 104. The intermediate node 104 may include the destination negative acknowledgment in a status message.

Figure 6A:
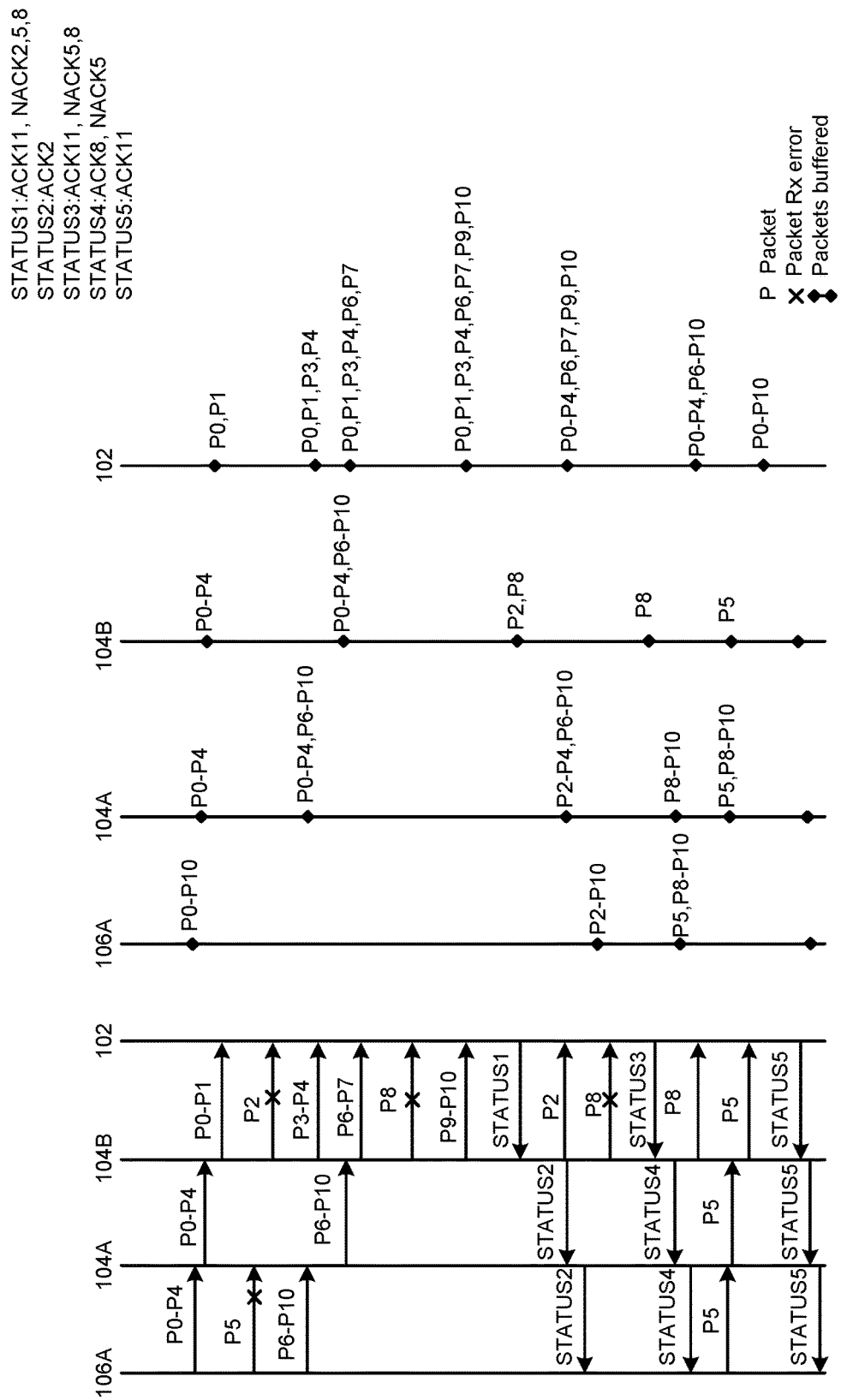
FIG. 6A shows timing diagrams for signaling and buffer management according to an example embodiment.

FIG. 6A shows timing diagrams for signaling and buffer management according to an example embodiment. In this example, the negative acknowledgment sequence numbers can be no greater than, and/or are less than, the acknowledgment sequence number. In this example, the UE 106A is a source node, and the donor node 102 is a destination node. Transmissions or receptions of packets or status reports may be performed at RLC level. Thus, any successful transmission/reception may include retransmissions at a lower protocol layer, such as MAC layer hybrid automatic repeat request (HARM) retransmissions. Also, the format of status reporting may be based on NR RLC status reporting which is described in 3GPP TS 38.322v. 15.0.0 but it is not limited to NR RLC. In FIG. 6A, the first four vertical lines show transmissions of packets and status reports between the UE 106A, intermediate nodes 104A, 104B, and donor node 102, and the second four vertical lines show storage of packets by the UE 106A, intermediate nodes 104A, 104B, and donor node 102.

In this example, the UE 106A buffers packets 0 through 10, and successfully transmits packets 0 through 4 to intermediate node 104A, which successfully transmits and/or forwards packets 0 through 4 to intermediate node 104B. Intermediate node 104B successfully transmits and/or forwards packets 0 and 1 to the donor node 102, but does not successfully transmit packet 2 to the donor node (as shown by the 'X'). At this point, as shown in the second set of four vertical lines, intermediate nodes 104A, 104B have stored packets 0 through 4 in the buffers of the intermediate nodes 104A, 104B, and the donor node 102 has stored packets 0 and 1 in the buffer of the donor node 102. Intermediate node 104B thereafter successfully transmits packets 3 and 4 to the donor node 102, and donor node then has packets 0, 1, 3, and 4 stored.

In this example, the UE 106A unsuccessfully transmits packet 5 to intermediate node 104A (as shown by the 'X'), and successfully transmits packets 6 through 10 to intermediate node 104A. The intermediate node 104A then has packets 0 through 4 and 6 through 10 stored. The intermediate node 104A then successfully transmits packets 6 through 10 to intermediate node 104B, and intermediate node 104B has packets 0 through 4 and 6 through 10 stored. The intermediate node 104B then successfully transmits packets 6 and 7 to the donor node 102. At this point the donor node 102 has packets 0, 1, 3, 4, 6, and 7 stored. The intermediate node 104B then unsuccessfully transmits packet 8 to the donor node 102, and successfully transmits packets 9 and 10 to the donor node 102. At this point the donor node has packets 0, 1, 3, 4, 6, 7, 9, and 10 stored.

The donor node 102 then sends acknowledgments of packets 0, 1, 3, 4, 6, 7, 9, and 10 and negative acknowledgments of packets 2, 5, and 8 to the node superordinate to the donor node 102, the intermediate node 104B. The acknowledgments and negative acknowledgments can be included in status message 1 (shown as STATUS1 in FIG. 6A). Status message 1 includes acknowledgment sequence number 11, indicating that packets with sequence numbers less than 11 were successfully received by the donor node 102 unless specifically negatively acknowledged. The status message 1 also includes explicit negative acknowledgments of packets 2, 5, and 8, indicated with negative acknowledgment sequence numbers 2, 5, and 8. The intermediate nodes 104A, 104B and/or donor node 102 can send status messages, which can also be considered status reports, to superordinate nodes in response to polls from the superordinate nodes, and/or in response to expiration of reassembly timers maintained by the intermediate nodes 104A, 104B and/or donor node 102.

In response to receiving the status message 1 that includes acknowledgments of packets 0, 1, 3, 4, 6, 7, 9, and 10, and negative acknowledgments of packets 2, 5, and 8, the intermediate node 104B deletes packets 0, 1, 3, 4, 6, 7, 9, and 10 from the buffer of the intermediate node 104B so that only packets 2 and 8 are still stored in the buffer of intermediate node 104B, and determines which of packets 2, 5, and 8 are stored in a buffer of the intermediate node 104B. In this example, the intermediate node 104B determines that packets 2 and 8 are stored in the buffer of the intermediate node 104B, and attempts to retransmit packets 2 and 8 to the donor node 102. The intermediate node 104B successfully transmits packet 2 to donor node 102, but unsuccessfully transmits packet 8 to the donor node 102. The intermediate node 104B also sends a status message 2 (shown as STATUS2 in FIG. 6A) to the superordinate node, the intermediate node 104A. The status message 2 includes acknowledgment sequence number 2 because packet 2 has the lowest sequence number of packets that were negatively acknowledged and which intermediate node 104B has buffered.

Because the status message 2 acknowledges packets 0 and 1, the intermediate node 104A deletes and/or erases and/or marks as erasable packets 0 and 1 from the buffer of intermediate node 104A, so that packets 2 through 4 and 6 through 10 are remaining in the buffer of intermediate node 104A. The intermediate node 104A forwards and/or sends the status message 2 to the superordinate node, the UE 106A. Based on the status message 2 acknowledging packets 0 and 1, the UE 106A deletes and/or erases packets 0 and 1 from a buffer of the UE 106A.

The donor node 102 then, for example autonomously (such as based on expiration of a reassembly timer maintained by the donor node 102) or in response to polling, acknowledges packets 0 through 4, 6, 7, 9, and 10, and negatively acknowledges packets 5 and 8 to the superordinate node, intermediate node 104B. The acknowledgments and negative acknowledgments can be included in status message 3 (shown as STATUS3 in FIG. 6A) sent by the donor node 102 to the intermediate node 104B. Status message 3 includes acknowledgment sequence number 11, indicating that packets with sequence numbers less than 11 were successfully received by the donor node 102 unless specifically negatively acknowledged. The status message 3 also includes explicit negative acknowledgments of packets 5 and 8 by including negative acknowledgment sequence number 5 and 8.

In this example, the intermediate node 104B determines that negatively acknowledged packet 8 is stored in the buffer of intermediate node 104B, but negatively acknowledged packet 5 is not stored in the buffer of intermediate node 104B. Based on determining that negatively acknowledged packet 8 is stored in the buffer of the intermediate node 104B, the intermediate node 104B successfully re-sends and/or transmits packet 8 to the subordinate node, the donor node 102.

The intermediate node 104B responds to the status message 3 by generating a new status message, status message 4 (shown as STATUS4 in FIG. 6A). The status message 4 includes an acknowledgment sequence number 8 because packet 8 had the lowest sequence number of packets negatively acknowledged by status message 3 that the intermediate node 104B has buffered, and a negative acknowledgment sequence number 5. The intermediate node 104B sends the status message 4 to the superordinate node, the intermediate node 104A.

The intermediate node 104A determines whether the packet that was negatively acknowledged by status message 4, packet 5, is stored in the buffer of intermediate node 104A. Based on determining that packet 5 is not stored in the buffer of intermediate node 104A, the intermediate node 104A forwards and/or sends the status message 4 to the superordinate node, the UE 106A.

Based on receiving the status message 4, and determining that the buffer of the UE 106A is storing packet 5, the UE re-sends and/or transmits packet 5 to the subordinate node, the intermediate node 104A. The intermediate node 104A re-sends, forwards, and/or transmits packet 5 to the subordinate node, intermediate node 104B. The intermediate node 104B re-sends, forwards, and/or transmits the packet 5 to the subordinate node, the donor node 102.

After receiving packet 5, the donor node 102 has all of packets 0 through 10 stored in the buffer of donor node 102. The donor node 102 sends an acknowledgment of packets 0 through 10, which can be included in a status message 5 (shown as STATUS5 in FIG. 6A), to the superordinate node, intermediate node 104B, which re-sends, forwards, and/or transmits the acknowledgment and/or status message 5 to the superordinate node, the intermediate node 104A, which re-sends, forwards, and/or transmits the acknowledgment and/or status message 5 to the superordinate node, the UE 106A.

Figure 6B:
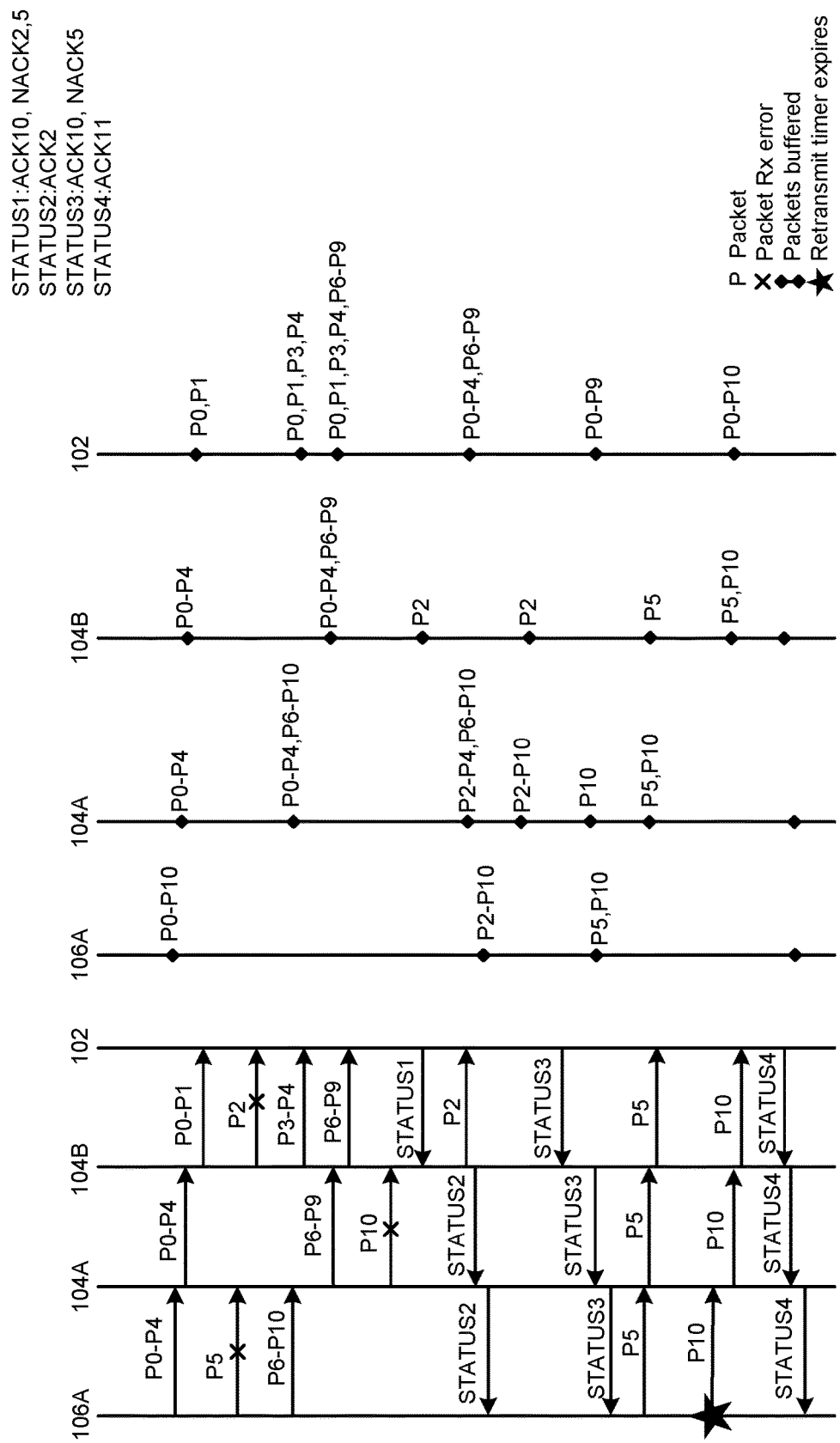
FIG. 6B shows timing diagrams for signaling and buffer management according to an example embodiment.

FIG. 6B shows timing diagrams for signaling and buffer management according to an example embodiment. In this example, the negative acknowledgment sequence numbers can be no greater than, and/or are less than, the acknowledgment sequence number. In this example, compared to the example of FIG. 6A, packet 8 is successfully transmitted by the intermediate node 104B to the donor node 102, but packet 10 is unsuccessfully transmitted by the intermediate node 104A to the intermediate node 104B. As a result, the status message 1, which is generated and sent by the donor node 102, acknowledges packets 0, 1, 3, 4, and 6 through 9 by identifying sequence number 10, which is one integer greater than the highest sequence number of the packets that were successfully received. Packet 10 is not explicitly negatively acknowledged, because the donor node 102 has no knowledge of whether packet 10 has been sent or if packet 9 was the last packet intended to be sent.

Based on the UE 106A not receiving an acknowledgment of packet 10 before expiration of a retransmission timer maintained by the UE 106A (as shown by the star symbol preceding P10), which may include, for example, a poll retransmission timer, the UE 106A retransmits the packet 10 to the subordinate node, and the packet 10 is forwarded, re-sent, and/or transmitted to subordinate nodes until being successfully received by the destination node, the donor node 102.

Figure 6C:
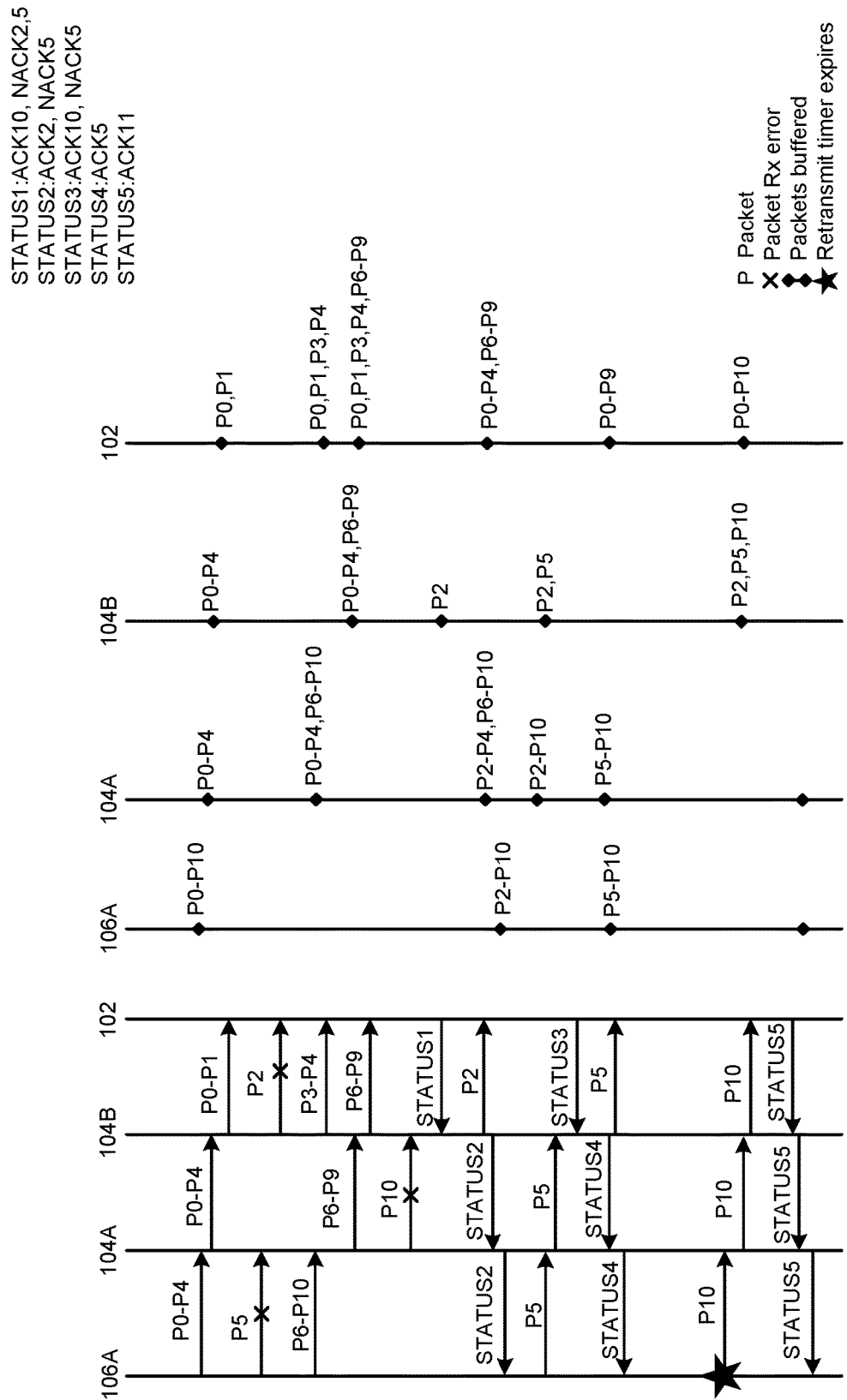
FIG. 6C shows timing diagrams for signaling and buffer management according to an example embodiment.

FIG. 6C shows timing diagrams for signaling and buffer management according to an example embodiment. In this example, compared to the example of FIG. 6B, the status messages can include negative acknowledgments of packets with sequence numbers greater than the highest sequence number of the acknowledged packets. In this example, the status message 2 includes a negative acknowledgment of packet 5, which has a higher sequence number than packet 2 (the lowest NACKed packet buffered by intermediate node 104B), compared to the status message 2 of FIG. 6B, which did not include a negative acknowledgment of packet 5. As a result of the status message 2 including the negative acknowledgment of packet 5 in the example of FIG. 6C, the packet 5 is fetched from the UE 106A and retransmitted by the intermediate node 104B to the donor node 102 much earlier than in the example of FIG. 6B.

Figure 7A:
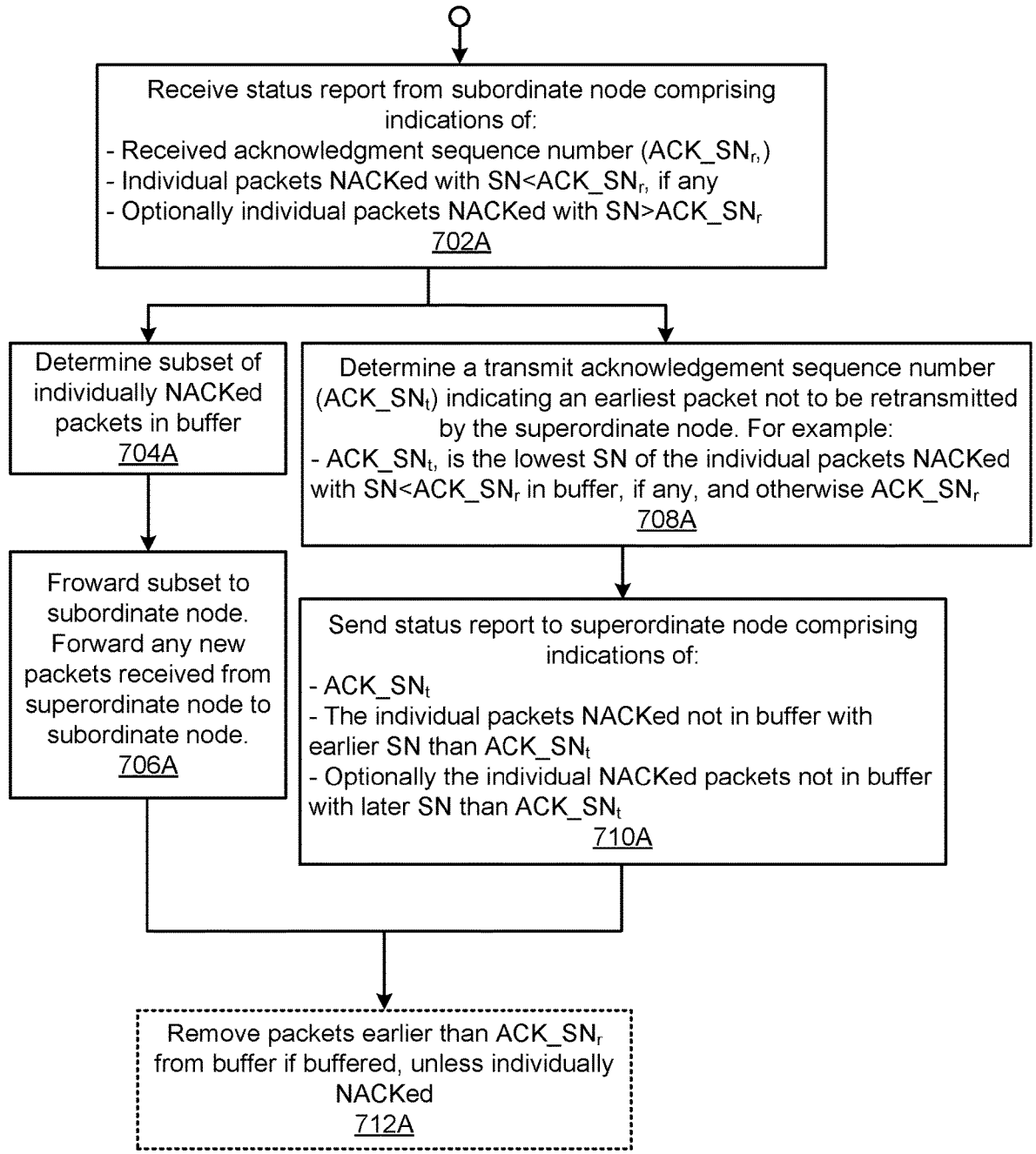
FIG. 7A is a flowchart showing a method performed by an intermediate node according to an example embodiment.

FIG. 7A is a flowchart showing a method performed by an intermediate node 104 according to an example embodiment. In this example, the method can include the intermediate node 104 receiving a status report from a subordinate node (702A). The status report can include a received acknowledgment sequence number ($ACK\_SN_r$), which may be a sequence number that is one higher than the highest sequence number of successfully received packets. The status report may also include indications of negatively acknowledged packets, and/or unsuccessfully received packets, with sequence numbers that are less than $ACK\_SN_r$. In some examples, the status report can include indications of negatively acknowledged packets, and/or unsuccessfully received packets, with sequence numbers that are greater than $ACK\_SN_r$. After receiving the status report, the intermediate node 104 can perform actions with respect to re-sending packets to the subordinate node (704A, 706A) and sending a status report to a superordinate node (708A, 710A).

The intermediate node 104 can determine whether a subset of the individually negatively acknowledged packets is stored in a buffer of the intermediate node 104 (704A). The intermediate node 104 can forward any of the subset of negatively acknowledged packets to a subordinate node, and forward any packets newly received from a superordinate node to the subordinate node (706A).

Concurrently with 704A and 706A, the intermediate node 104 can determine a transmit acknowledgment sequence number ($ACK\_SN_t$) (708A). The transmit acknowledgment sequence number can indicate an earliest packet not to be retransmitted by the superordinate node. For example, the transmit acknowledgement sequence number ($ACK\_SN_t$) can be the lowest sequence number of packets individually negatively acknowledged that have sequence numbers less than the acknowledgment sequence number ($ACK\_SN_r$) and are stored in the buffer of the intermediate node 104. If no individually acknowledged packets have sequence numbers less than the acknowledgment sequence number ($ACK\_SN_r$), then the transmit acknowledgment sequence number ($ACK\_SN_t$) is equal to the acknowledgment sequence number ($ACK\_SN_r$).

In some examples, the transmit acknowledgement may be set to the highest sequence number of packets individually negatively acknowledged that have sequence numbers less than the acknowledgment sequence number ($ACK\_SN_r$) and are stored in the buffer of the intermediate node 104.

After determining the transmit acknowledgment sequence number ($ACK\_SN_t$) (708A), the intermediate node 104 can send a status report to the superordinate node (710A). The status report can include indications of the transmit acknowledgment sequence number ($ACK\_SN_t$) and individual negatively acknowledged packets not stored in the buffer that have sequence numbers lower than the transmit acknowledgment sequence number ($ACK\_SN_t$). In some examples, the status report can include indications of negatively acknowledged packets not stored in the buffer that have sequence numbers greater than the transmit acknowledgment sequence number ($ACK\_SN_t$).

After performing 704A, 706A, 708A, and 710A, the intermediate node 104 can remove, delete, and/or erase, from the buffer of the intermediate node 104, packets with sequence numbers lower and/or earlier than acknowledgment sequence number ($ACK\_SN_r$) if these packets were stored in the buffer of the intermediate node 104 and were not individually negatively acknowledged (712A).

Figure 7B:
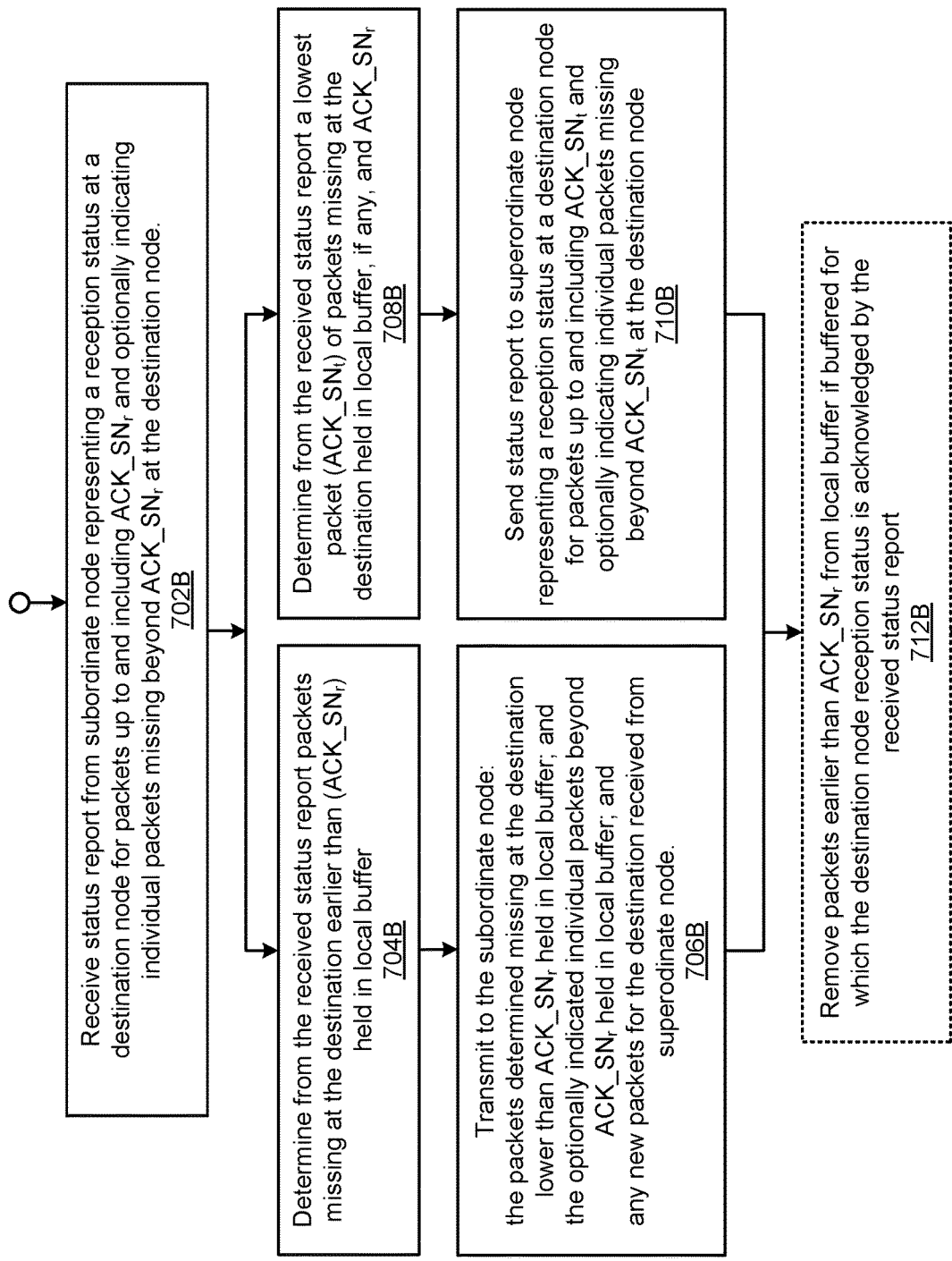
FIG. 7B is a flowchart showing a method performed by an intermediate node according to an example embodiment.

FIG. 7B is a flowchart showing a method performed by an intermediate node 104 according to an example embodiment. In some examples, the intermediate node 104 can receive a status report from a subordinate node (702B). The status report can represent a reception status, and/or successful receipt status, at a destination node for packets with sequence numbers up to and including the acknowledgment sequence number (ACK_SN$_r$). In some examples, the status report can also indicate individual packets that have not been successfully received and have sequence numbers greater than the acknowledgment sequence number (ACK_SN$_r$). After receiving the status report, the intermediate node can concurrently perform actions with respect to transmitting packets to the subordinate node (704A, 706B) and sending a status report to a superordinate node (708B, 710B). For the packet with sequence number ACK_SN$_r$, the status report may indicate that the packet is not being acknowledged without distinguishing whether the packet is negatively acknowledged (such as received unsuccessfully) or was never received.

The intermediate node 104 can determine which packets, if any, identified by the received status report as missing and/or not being successfully received, are stored in the buffer of the intermediate node 104 (704B). The intermediate node 104 can transmit, to the subordinate node, the packets that were identified as missing and which were stored in the buffer of the intermediate node 104 (706B). The intermediate node 104 can also transmit, to the subordinate node, packets that are newly received from the superordinate node. In some embodiments, the intermediate node 104 may refrain from transmitting any of the newly received packets that are positively acknowledged in the received status report.

Concurrently with 704B and 706B, the intermediate node 104 can determine, from the received status report, a lowest transmit acknowledgment sequence number (ACK_SN$_t$) of packets missing at the destination node, and/or which have not been successfully received by the destination node, and which are stored in the buffer of the intermediate node 104 (708B). If there are no such stored packets, the intermediate node 104 can also determine the lowest transmit acknowledgment sequence number (ACK_SN$_t$) to be equal to ACK_SN$_r$.

After determining the lowest transmit acknowledgment sequence number (ACK_SN$_t$), the intermediate node 104 can send a status report to the superordinate node (710B). The status report can represent and/or indicate a reception status, and/or successful transmission status, at the destination node for packets with sequence numbers up to the transmit acknowledgment sequence number (ACK_SN$_t$). In some examples, the status report can also indicate individual packets missing at, and/or not successfully received by, the destination node, and which have sequence numbers greater than the transmit acknowledgment sequence number (ACK_SN$_t$).

After performing 704B, 706B, 708B, and 710B, the intermediate node 104 can remove, delete, erase and/or mark as erasable, packets from the buffer of the intermediate node 104 that have sequence numbers earlier than and/or lower than the acknowledgment sequence number (ACK_SN$_r$) if the packets were stored in the buffer of the intermediate node 104 and the received status report indicates that the destination node successfully received the packet(s) (712B).

Figure 8:
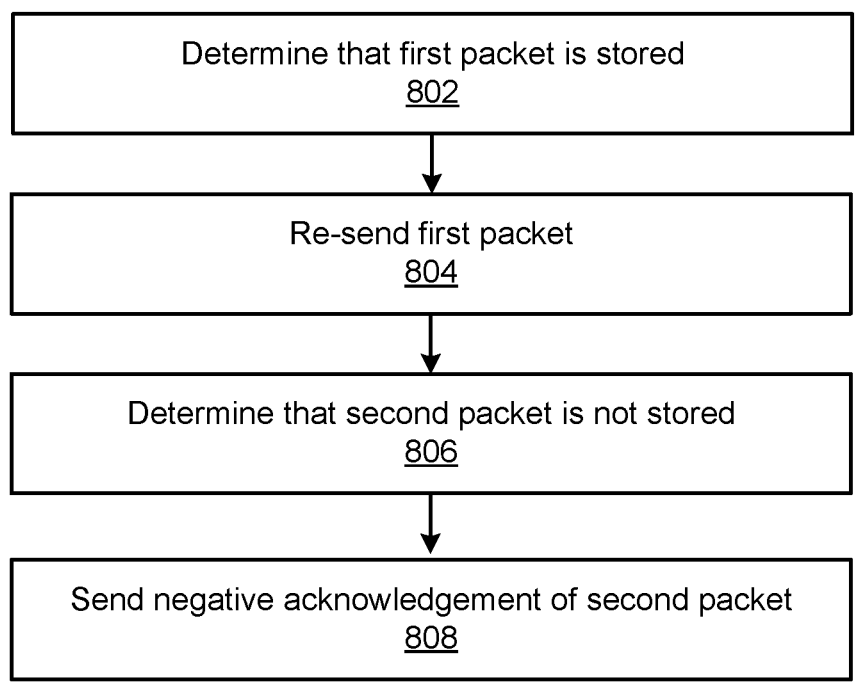
FIG. 8 is a flowchart showing a method performed by an intermediate node according to an example embodiment.

FIG. 8 is a flowchart showing a method performed by an intermediate node according to an example embodiment. According to some examples, the method can include determining that a first packet, for which the intermediate node received a negative acknowledgment from a subordinate node to which the intermediate node previously sent the first packet, is stored in a buffer of the intermediate node (802). The method can also include, based on determining that the first packet is stored in the buffer, re-sending the first packet to the subordinate node without sending the negative acknowledgement to a superordinate node of the intermediate node (804). The method can also include determining that a second packet, for which the intermediate node received a negative acknowledgment from the subordinate node to which the intermediate node previously sent the second packet, is not stored in a buffer of the intermediate node (806). The method can also include, based on determining that the second packet is not stored in the buffer, sending a negative acknowledgment of the second packet to the superordinate node (808).

According to some examples, the first packet and the second packet previously may have been received by the intermediate node from the superordinate node.

Figure 9:
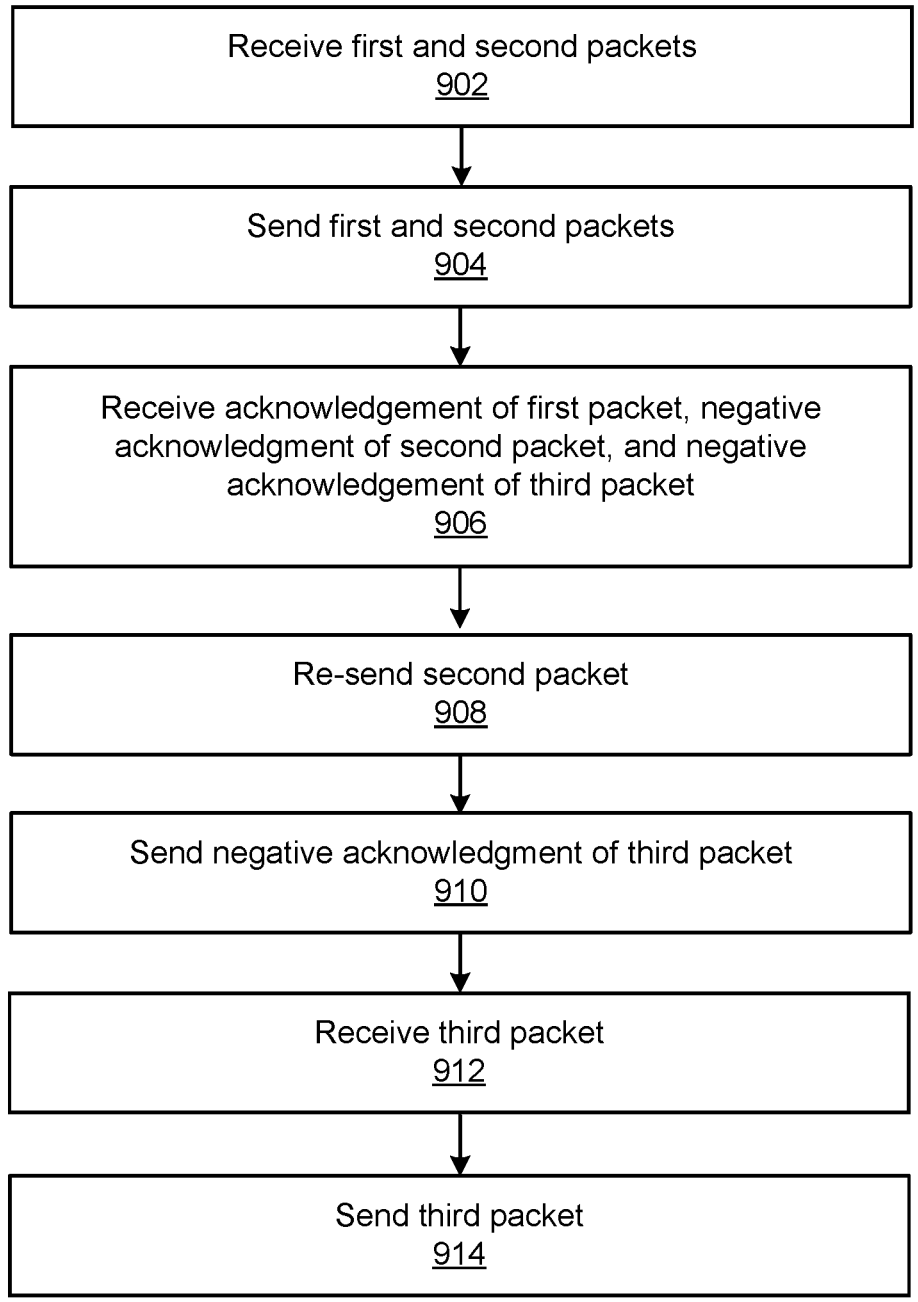
FIG. 9 is a flowchart showing a method performed by an intermediate node according to an example embodiment.

FIG. 9 is a flowchart showing a method performed by an intermediate node according to an example embodiment. The method can include receiving, from a superordinate node, a first packet and a second packet (902). The method can also include sending the first packet and the second packet to a subordinate node (904). The method can also include receiving, from the subordinate node, an acknowledgment of the first packet, a negative acknowledgment of the second packet, and a first negative acknowledgment of a third packet (906). The method can also include re-sending, to the subordinate node in response to receiving the negative acknowledgment of the second packet, the second packet (908). The method can also include sending, to the superordinate node in response to receiving the first negative acknowledgment of the third packet, a second negative acknowledgment of the third packet (910). The method can also include receiving, from the superordinate node, the third packet (912). The method can also include sending, to the subordinate node, the third packet (914).

According to some examples, the sending the second negative acknowledgement is performed in response to verifying that the third packet is not stored in a buffer of the intermediate node, and the re-sending the second packet is performed in response to verifying that the second packet is stored in the buffer.

According to some examples, the acknowledgment of the first packet, the negative acknowledgment of the second packet, and the first negative acknowledgment of the third packet are included in a status message received from the subordinate node. The status message can indicate a sequence number of a fourth packet not yet transmitted by the intermediate node. The fourth packet can have a higher sequence number than the first, second and third packet.

According to some examples, the sending the second negative acknowledgement can include sending a second status message. The second status message can indicate a sequence number of the second packet and the second negative acknowledgement, but not indicate the sequence number of the fourth packet.

According to some examples, a sequence number of the first packet can be lower than a sequence number of the second packet. The intermediate node can receive the first packet from the superordinate node before receiving the second packet from the superordinate node.

According to some examples, the method can further include storing the first packet and the second packet in a buffer in response to receiving the first packet and the second packet, deleting the first packet from the buffer in response to receiving the acknowledgment of the first packet, receiving, from the subordinate node, an acknowledgment of the re-sent second packet, and deleting the second packet from the buffer in response to receiving the acknowledgment of the re-sent second packet.

According to some examples, the method can further include storing the third packet in the buffer in response to receiving the third packet, receiving, from the subordinate node, an acknowledgment of the third packet, and deleting the third packet from the buffer in response to receiving the acknowledgment of the third packet.

According to some examples, the method can further include, in response to receiving the negative acknowledgment of the second packet, determining that the second packet is stored in the buffer, and in response to receiving the first negative acknowledgment of the third packet, determining that the third packet is not stored in the buffer. In this example, the re-sending, to the subordinate node in response to receiving the negative acknowledgment of the second packet, the second packet, is performed based on the determination that the second packet is stored in the buffer, and the sending, to the superordinate node in response to receiving the first negative acknowledgment of the third packet, the second negative acknowledgment of the third packet, is performed based on the determination that the third packet is not stored in the buffer.

According to some examples, the first and second packets were successfully transmitted from the superordinate node to the intermediate node, and the third packet was not successfully transmitted from the superordinate node to the intermediate node.

Figure 10A:
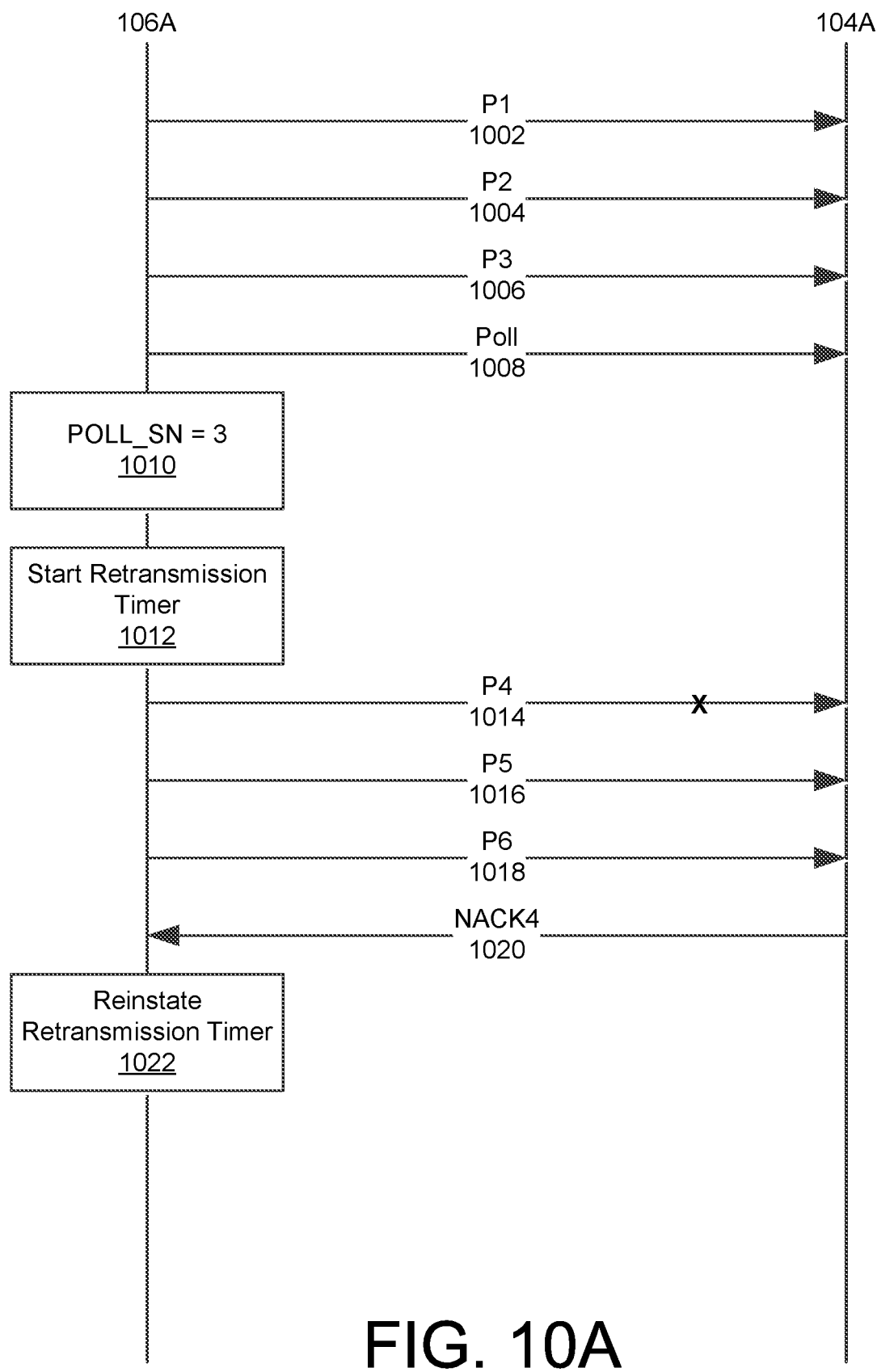
FIG. 10A is a timing diagram showing a first wireless node reinstate a poll retransmission timer based on receiving a negative acknowledgment sequence number that is greater than a polling sequence number.

FIG. 10A is a timing diagram showing a first wireless node reinstate a poll retransmission timer based on receiving a negative acknowledgment sequence number that is greater than a polling sequence number. The first wireless node can include a user equipment 106A. The second wireless node can include an intermediate node 104A. The first wireless node can either stop and reset, or restart, the poll retransmission timer in response to receiving the negative acknowledgment sequence number that is greater than a polling sequence number.

The user equipment 106A and/or first wireless node can send multiple packets 1002, 1004, 1006 to the intermediate node 104A and/or second wireless node. The multiple packets 1002, 1004, 1006 can be associated with multiple sequence numbers. In some examples, the sequence numbers associated with the multiple packets 1002, 1004, 1006 are sequential. In the example shown in FIG. 10A, packet P1 1002 is associated with sequence number 1, packet P2 1004 is associated with sequence number 2, and packet P3 1006 is associated with sequence number 3. While FIG. 10A shows the user equipment 106A sending three packets 1002, 1004, 1006 for illustrative purposes, the user equipment 106A can send any number of packets. Using the $3^{rd}$ Generation Partnership Project terminology, the packets 1002, 1004, 1006 can include protocol data units (PDUs) and/or service data units (SDUs), as non-limiting examples.

After sending the multiple packets 1002, 1004, 1006 to the intermediate node 104A, the user equipment 106A can send a poll 1008 to the intermediate node 104A. The poll 1008 may be combined with the last packet P3 1006. The poll may be, and/or may be indicated by, a bit value in the PDU header of the packet P3 1006. In some examples, the user equipment 106A can send the poll 1008 based on both a transmission buffer and retransmission buffer becoming empty (excluding packets 1002, 1004, 1006 for which the user equipment is awaiting acknowledgment). In some examples, the user equipment 106A can send the poll 1008 based on not being able to transmit any new packets, such as because a transmission window has stalled. In some examples, the user equipment 106A can send the poll based on either of the transmission buffer and retransmission buffer becoming empty or not being able to transmit any new packets.

In some examples, the poll 1008 can trigger status reporting by the intermediate node 104A. In some examples, the poll 1008 can request the intermediate node 104A to send indications to the user equipment 106A of whether the multiple packets 1002, 1004, 1006 were successfully received. In some examples, the indications of whether the multiple packets 1002, 1004, 1006 were successfully received can be included in a status report, as described above. The intermediate node 104A can indicate to the user equipment 106A whether the multiple packets 1002, 1004, 1006 were successfully received by sending to the user equipment 106A acknowledgments, negative acknowledgments, and/or a status report that can include acknowledgments and/or negative acknowledgments.

After sending the poll 1008 to the intermediate node 104A, the user equipment 106A can set a polling sequence number (1010). The user equipment 106A can set the polling sequence number (POLL_SN) to a highest sequence number associated with the multiple packets sent by the user equipment 106A to the intermediate node 104A when the user equipment 106A sent the poll 1008 to the intermediate node 104A. The user equipment 106A can compare acknowledgment sequence numbers and/or negative acknowledgment sequence numbers received from the intermediate node 104A to the polling sequence number to determine whether the poll has been received by the intermediated node 104A and/or whether to resend a poll to the intermediate node 104A. In the example shown in FIG. 10A, the highest sequence number associated with the multiple packets sent by the user equipment 106A to the intermediate node 104A when the user equipment 106A sent the poll 1008 to the intermediate node 104A is 3. Based on the highest sequence number associated with the multiple packets sent by the user equipment 106A to the intermediate node 104A when the user equipment 106A sent the poll 1008 to the intermediate node 104A being 3, the user equipment 106A sets the polling sequence number to 3. In some examples, the poll 1008 is sent together with the last packet (such as P3 1006) of the multiple packets and the polling sequence number is then the sequence number of that last packet.

After sending the poll 1008, the user equipment 106A can start a (poll) retransmission timer (1012). In some examples, if the poll retransmission timer is not running, the user equipment can start the poll retransmission timer. In some examples, if the poll retransmission timer is already running, the user equipment can restart the poll retransmission timer.

The user equipment 106A can start the retransmission timer (1012) before, after, or at the same time as setting the polling sequence number. The retransmission timer can create a time window for the user equipment 106A to receive acknowledgments and/or negative acknowledgments of the multiple packets 1002, 1004, 1006 that the user equipment 106A sent to the intermediate node 104A before sending the poll 1008 to the intermediate node 104A. In some examples, if the user equipment 106A does not receive acknowledgments or negative acknowledgments of all of the multiple packets 1002, 1004, 1006 that the user equipment 106A sent to the intermediate node 104A before sending the poll 1008 to the intermediate node 104A, then the user equipment 106A can send a subsequent poll to the intermediate node 104A. In some examples, if the user equipment 106A does not receive acknowledgments or negative acknowledgments of the packet 1006 with the polling sequence number that the user equipment 106A sent to the intermediate node 104A, then the user equipment 106A can send a subsequent poll to the intermediate node 104A. In some examples, if the user equipment 106A does not receive acknowledgments or negative acknowledgments of all of the multiple packets 1002, 1004, 1006 that the user equipment 106A sent to the intermediate node 104A before sending the poll 1008 to the intermediate node 104A, then the user equipment 106A can resend, to the intermediate node 104A, previously-sent packets 1002, 1004, 1006 that have not been acknowledged. In some examples, if the user equipment 106A does not receive acknowledgments or negative acknowledgments of all of the multiple packets 1002, 1004, 1006 that the user equipment 106A sent to the intermediate node 104A before sending the poll 1008 to the intermediate node 104A, and a queue and/or buffer of new packets maintained by the user equipment 106A for sending new and/or unsent packets to the intermediate node 104A is empty, then the user equipment 106A can resend, to the intermediate node 104A, previously-sent packets 1002, 1004, 1006 that have not been acknowledged.

After sending the poll 1008, setting the polling sequence number (1010), and starting the retransmission timer (1012), the user equipment 106A can continue sending packets 1014, 1016, 1018 to the intermediate node 104A. The packets 1014, 1016, 1018 sent to the intermediate node 104A subsequent to setting the polling number (1010) can have higher sequence numbers than the polling sequence number (in the example shown in FIG. 10A, the sequence numbers of the packets 1014, 1016, 1018 sent to the intermediate node 104A subsequent to setting the polling number are 4, 5, and 6, respectively).

After sending the poll 1008, setting the polling sequence number (1010), starting the retransmission timer (1012), and sending subsequent packets 1014, 1016, 1018, the user equipment 106A can receive a negative acknowledgment 1020 from the intermediate node 104A. In some examples, the negative acknowledgment 1020 can be included in a status report, as described above. In some examples, the status report can include a negative acknowledgment sequence number and an acknowledgment sequence number. In some examples, the negative acknowledgment sequence number can be greater than the acknowledgment sequence number.

In some examples, the intermediate node 104A can send a status report to the user equipment 106A in response to receiving an end-to-end acknowledgment from a subordinate node. The subordinate node can indicate the end-to-end acknowledgment to the intermediate node with either an acknowledgment sequence number indicating the sequence number of the packet(s) being end-to-end acknowledged, or with a protocol sequence number (which can be represented as ACK_SN_PDCP) indicating the sequence number of the packet(s) being end-to-end acknowledged, according to example embodiments.

If a negative acknowledgment sequence number of the negative acknowledgment 1020 is greater than the polling sequence number, then the user equipment 106A can reinstate the retransmission timer (1022). The user equipment 106A can reinstate the retransmission timer (1022) in response to receiving the negative acknowledgment 1020 with a negative acknowledgment sequence number that is greater than the polling sequence number. In some examples, the user equipment 106A can reinstate the retransmission timer (1022) by stopping and resetting the poll retransmission timer. In some examples, the user equipment 106A can reinstate the retransmission timer (1022) by restarting the poll retransmission timer. In the example shown in FIG. 10A, the negative acknowledgment sequence number is 4 (based on the P4 1014 not being correctly received, as indicated by the 'X'), which is greater than the polling sequence number of 3. Based on the negative acknowledgment sequence number being greater than the polling sequence number, the user equipment reinstates the retransmission timer (1022). Reinstating the retransmission timer (1022) can enable the user equipment 106A to determine whether some packets 1014, 1016, 1018 with sequence numbers greater than the polling sequence number have been successfully received by the intermediate node 104A, by allowing more time for the user equipment 106A to receive acknowledgments from the intermediate node 104A. In some examples, the reinstating the poll retransmission timer happens when the acknowledgement sequence number in the received status report is smaller than, and/or less than, the polling sequence number and the negative acknowledgment sequence number is greater than the polling sequence number. For instance in the example of FIG. 10A, the acknowledgement sequence number (ACK_SN) in the status report could be equal to 1 or 2 (both are less than the polling sequence number equal to 3) and the negative acknowledgement sequence number (NACK_SN) could be equal to 4 (which is greater than the polling sequence number of 3).

In some examples, if the poll retransmission timer expires and a queue and/or buffer of new packets maintained by the user equipment 106A to send to the second wireless node and/or intermediate node 104A is empty, the user equipment 106A can send and/or resend at least one of the multiple packets 1002, 1004, 1006 to the intermediate node 104A. In some examples, the user equipment 106A can send and/or resend at least one of the multiple packets 1002, 1004, 1006 to the intermediate node 104A in response to the poll retransmission timer expiring and the queue and/or buffer of new packets maintained by the user equipment 106A to send to the second wireless node being empty. In some examples, the user equipment 106A can send and/or resend at least one of the multiple packets 1002, 1004, 1006 to the intermediate node 104A in response to the poll retransmission timer expiring and not receiving an acknowledgment of the packet(s) 1002, 1004, 1006 to be sent and/or resent.

In some examples, the user equipment 106A can send a subsequent poll to the intermediate node 104A in response to the poll retransmission timer expiring. The subsequent poll can prompt the intermediate node 104A to send acknowledgment(s), negative acknowledgment(s), and/or a status report(s) to the user equipment 106A.

In some examples, upon reception of a status report (which can be represented as STATUS) from the intermediate node 104A (which can be considered a receiving RLC AM entity), the user equipment 106A (which can be considered the transmitting side of an AM RLC entity) can, if the status report comprises a positive or negative acknowledgment for the Radio Link Control Service Data Unit (RLC SDU) with a sequence number equal to the polling sequence number (which can be represented as POLL_SN), or if the status report comprises a negative acknowledgment for the RLC SDU with a sequence number higher than POLL_SN, and the poll retransmission timer (which can be represented as t-PollRetransmit) is running, stop and reset the poll retransmission timer. This example protocol is reflected in FIG. 10A.1.

Figure 10B:
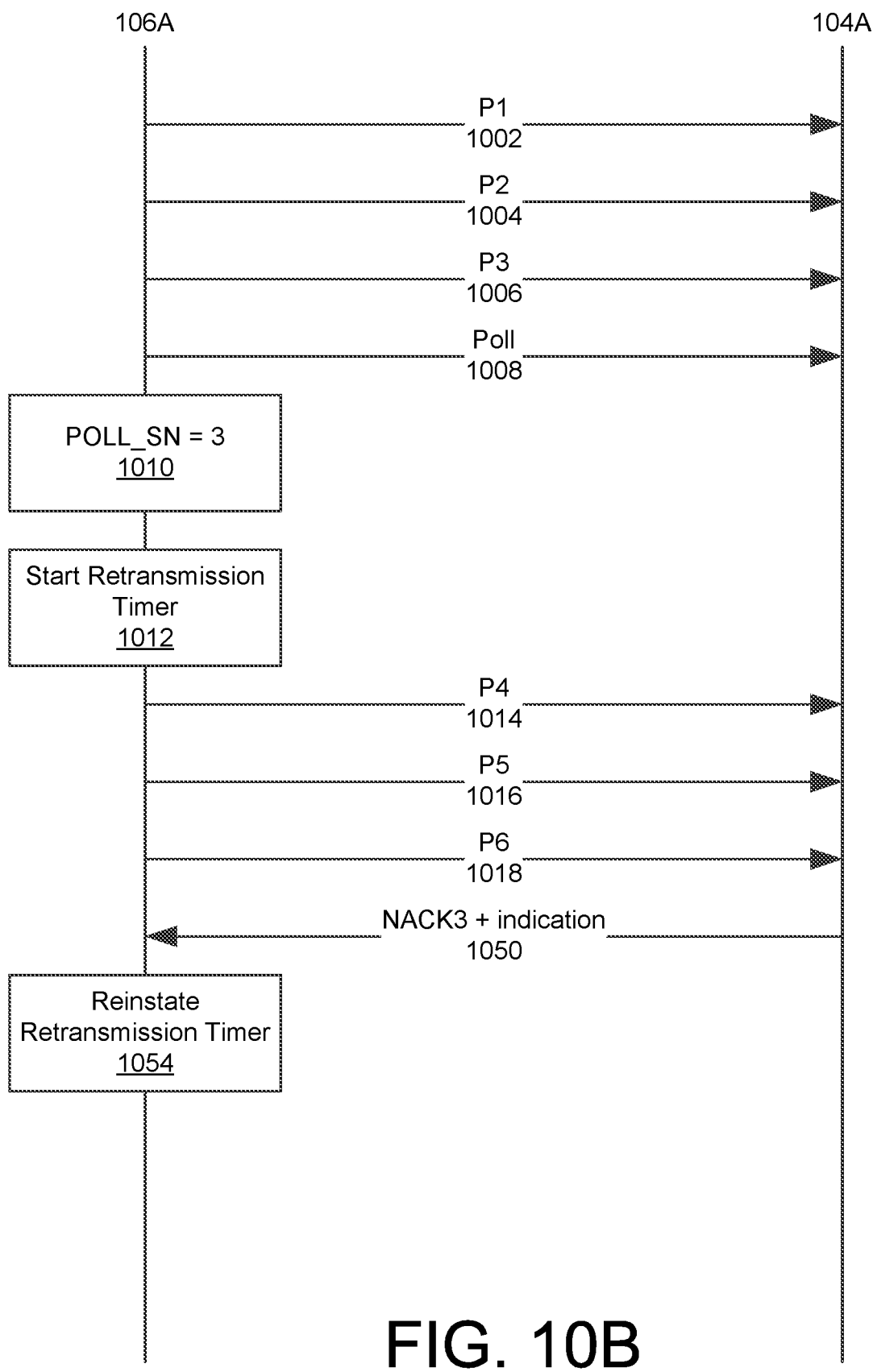
FIG. 10B is a timing diagram showing the first wireless node reinstate the poll retransmission timer based on receiving a negative acknowledgment sequence number that is equal to a polling sequence number.

FIG. 10B is a timing diagram showing the first wireless node (such as the user equipment 106A) reinstate the poll retransmission timer based on receiving a negative acknowledgment sequence number that is equal to a polling sequence number. In this example, the user equipment 106A sends multiple packets 1002, 1004, 1006 to the second wireless node (which can be an intermediate node 104A), sends a poll 1008 to the intermediate node 104A, sets a polling sequence number (1010), starts a retransmission timer (1012), and continues sending packets 1014, 1016, 1018 to the intermediate node 104A, as discussed above with respect to FIG. 10A.

In some examples, the intermediate node 104A can send, and/or the user equipment 106A can receive, a status report which includes a negative acknowledgment sequence number 1050 and an indication. In some examples, the indication can be a new field added to the status report indicating that the RLC SDU with SN equal to NACK_SN shall not be retransmitted. In some examples, the indication can be a first special value for a first indicator of a beginning of a lost portion of data and a second special value for a second indicator of an end of the lost portion of data. In some examples, the first indicator can include an SOstart field. In some examples, the first special value and/or the second special value can be included in the status report when the intermediate node 104A has received a poll with a sequence number that falls within a sequence number receiving window, such as a polling sequence number that is greater than or equal to an acknowledgment sequence number and less than a sum of an indicator of a next packet to be received (which can be represented as RX_Next) and a window size (which can be represented as AM_Window_Size).

In some examples, the negative acknowledgment can include a second special value for a second indicator of an end of the lost portion of data. In some examples, the second indicator can include an SOend field. In some examples, the first special value and/or first indicator can be different than, and/or greater than, the second special value and/or second indicator. In some examples, the first special value and/or first indicator can be, "1111111111111111," and the second special value and/or second indicator can be, "0000000000000000." The higher and/or greater value of the first special value than the second special value indicates that the packet with the sequence number equal to the polling sequence number was successfully received. In some examples, when a negative acknowledgement, together with first and second indicators as described in this paragraph, is received, the poll retransmission timer can be be stopped and reset and the packet with sequence number equal to the negative acknowledgement sequence number (and the poll sequence number) should not be considered for retransmission.

In some examples, the intermediate node 104A can send to the user equipment 106A, and/or the user equipment 106A can receive from the intermediate node 104A, a negative acknowledgment 1050 with a negative acknowledgment sequence number equal to the polling sequence number. In the example shown in FIG. 10B, the user equipment 106A receives a negative acknowledgment 1050 from the intermediate node 104A with a negative acknowledgment sequence number of 3, which is equal to the polling sequence number of 3. Based on, and/or in response to, receiving the negative acknowledgment 1050 with the negative acknowledgment sequence number equal to the polling sequence number, the user equipment 106A can reinstate the poll retransmission timer (1052), such as by stopping and resetting the poll retransmission timer or restarting the poll retransmission timer. The user equipment 106A and/or intermediate node 104A can also perform other methods, functions, and/or techniques as described above with respect to FIG. 10A.

In some examples, when constructing a status packet data unit (which can be represented as STATUS PDU), the AM RLC entity can, for RLC SDUs with sequence numbers (which can be represented as SN) such that RX_Next<=SN<RX_Highest_Status (which can represent the highest sequence number of a packet for which a status report has been sent) that has not been completely received yet, in increasing sequence number order of RLC SDUs and increasing byte segment order within RLC SDUs, starting with SN=RX_Next up to the point where the resulting STATUS PDU still fits to the total size of RLC PDU(s) indicated by lower layer, for an RLC SDU for which no byte segments have been received yet, include in the STATUS PDU a NACK_SN which is set to the SN of the RLC SDU; for a continuous sequence of byte segments of a partly received RLC SDU that have not been received yet, include in the STATUS PDU a set of NACK_SN, SOstart and SOend, and for a continuous sequence of RLC SDUs that have not been received yet, include in the STATUS PDU a set of NACK_SN and NACK range, and include in the STATUS PDU, if required, a pair of SOstart and SOend. The AM RLC can also set the ACK_SN to the SN of the next not received RLC SDU which is not indicated as missing in the resulting STATUS PDU, and if the RLC SDU or RLC SDU segment with a poll has been received with SN=x such that ACK_SN<=x<RX_Next+AM_Window_Size, include in the STATUS PDU a NACK_SN=x, SOstart with value, "1111111111111111," and SOend with value, "0000000000000000". This example protocol is reflected in FIG. 10B.1.

Figure 11:
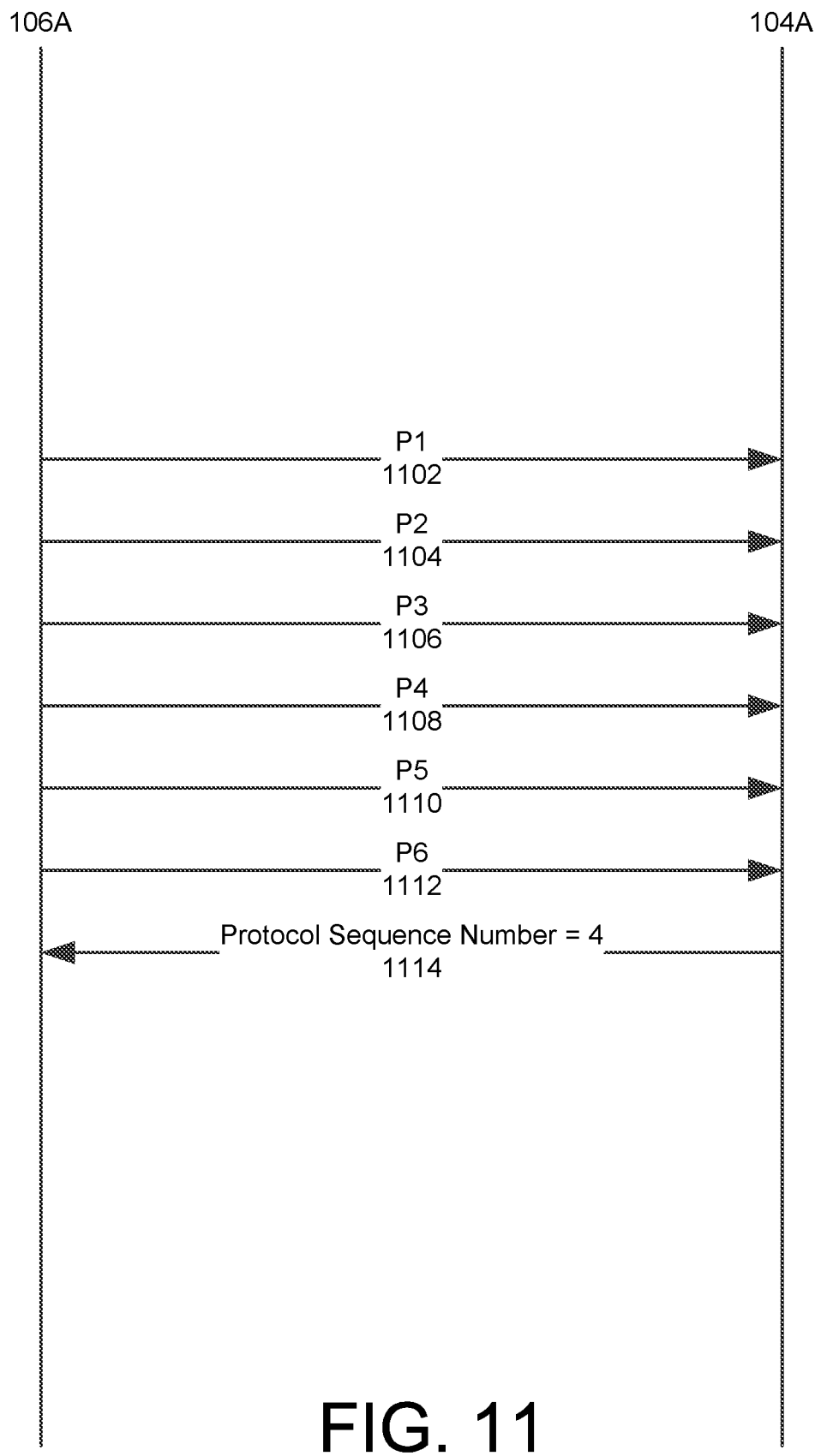
FIG. 11 is a timing diagram showing the first node receive, from a second node, a protocol sequence number indicating a highest sequence number of packets received by a third wireless node.

FIG. 11 is a timing diagram showing the first node (such as the user equipment 106A) receive, from the second node (such as the intermediate node 104A), a protocol sequence number indicating a highest sequence number of packets received by a third wireless node. The user equipment 106A can send multiple packets 1102, 1104, 1106, 1108, 1110, 112 to the intermediate node 104A. The multiple packets 1102, 1104, 1106, 1108, 1110, 112 can be associated with sequence numbers. In some examples, the sequence numbers associated with the multiple packets 1102, 1104, 1106, 1108, 1110, 112 can be sequential, such as the sequence numbers 1, 2, 3, 4, 5, and 6 associated with the respective packets 1102, 1104, 1106, 1108, 1110, 1112 in the example shown in FIG. 11.

In some examples, the user equipment 106A can receive, from the intermediate node 104A, a protocol sequence number 1114. In some examples, protocol sequence number 1114 can indicate a highest sequence number of packets successfully received by a third wireless node. The third wireless node can be subordinate to the second wireless node (such as the intermediate node 104A). The third wireless node can include, for example, any of the nodes shown in FIG. 1 as subordinate to the intermediate node 104A, such as the intermediate node 104B, the intermediate node 104C, the intermediate node 104D, or the donor node 102. In some examples, the protocol sequence number 1114 can indicate a highest sequence number that can be indicated to upper layers of the user equipment 106A, such as the Packet Data Convergence Protocol (PDCP) layer and/or the application layer.

In some examples, the protocol sequence number 1114 can be included in a separate RLC control PDU. In some examples, the protocol sequence number 1114 can be included in a status report sent by the intermediate node 104A to the user equipment 106A. The intermediate node 104A may have sent the status report to the user equipment 106A in response to the user equipment 106A sending a poll to the intermediate node 104A, as discussed above. In some examples, the status report can also include an acknowledgment sequence number. In some examples, the acknowledgment sequence number can identify a next sequence number not reported as missing by the status report, and/or a next sequence number for which the user equipment 106A should send packets. In some examples, the protocol sequence number 1114 is less than or equal to the acknowledgment sequence number included in the status report that also includes the protocol sequence number 1114. In some examples, the acknowledgment sequence number can have any features of, and/or perform any functions of, the acknowledgment sequence numbers described above. In some examples the protocol sequence number can serve as the lower end of a transmitting window, so that Tx_Next_Ack<=ACK_SN_PDCP. In some examples, the user equipment 106A can send, to the upper layer(s) of the user equipment 106A, which can include layers such as the Packet Data Convergence Protocol (PDCP) layer and/or the application layer, an indication of successful delivery of the packets whose sequence number is less than or equal to the protocol sequence number. In some examples, the indication to upper layers can be triggered by the reception of the protocol sequence number.

In some examples, the user equipment 106A can also send a poll to the intermediate node 104A. The user equipment 106A can send the poll to the intermediate node 104A after sending any number of packets 1102, 1104, 1106, 1108, 1110, 1112 to the intermediate node 104A, and/or before receiving the protocol sequence number 1114 and/or status report from the intermediate node 104A. In some examples, the poll can request indications of whether the multiple packets were successfully received. In some examples, the protocol sequence number 1114 can be received by the user equipment 106A in response to sending the poll to the intermediate node 104A, and/or the intermediate node 104A can send the protocol sequence number 1114 to the user equipment 106A in response to receiving the poll from the user equipment 106A. The poll can have any of the features and/or functionalities of the poll(s) described above.

Figure 12:
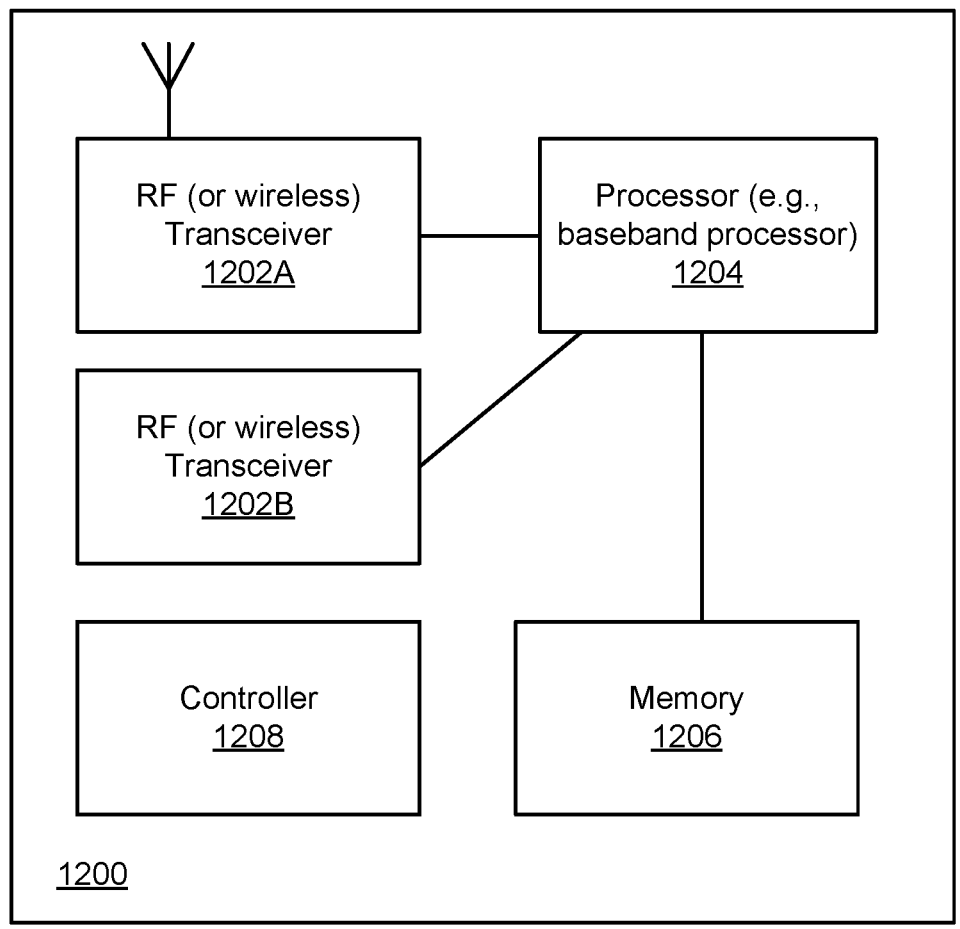
FIG. 12 is a block diagram of a wireless station according to an example embodiment.

FIG. 12 is a block diagram of a wireless station 1200 according to an example embodiment. The wireless station 1200 may include an intermediate node 104, such as an Integrated Access and Backhaul (IAB) node and/or relay node, or a user equipment 106. The wireless station 1200 may include, for example, one or two RF (radio frequency) or wireless transceivers 1202A, 1202B, where each wireless transceiver includes a transmitter to transmit signals and a receiver to receive signals. The wireless station also includes a processor 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202. Processor 1204 may control transmission of signals or messages over a wireless network, and may receive signals or messages, etc., via a wireless network (e.g., after being downconverted by wireless transceiver 1202, for example). Processor 1204 may be programmable and capable of executing software or other instructions stored in memory or on other computer media to perform the various methods, tasks, and/or functions described above, such as one or more of the methods, tasks, and/or functions described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

The wireless station 1200 may also include a memory 1206. The memory 1206 may include a non-transitory computer-readable storage medium. The memory 1206 may store instructions that, when executed, cause the wireless station 1200 to perform any combination of the methods, functions, and/or techniques described herein. The memory 1206 may also include the buffer that stores packets as described above.

Example 1. A method can include sending, by a first wireless node to a second wireless node, multiple packets, the multiple packets being associated with multiple sequence numbers; sending a poll to the second wireless node, the poll requesting indications of whether the multiple packets were successfully received; setting a polling sequence number to a highest sequence number associated with the multiple packets sent by the first wireless node when the first wireless node sent the poll; starting a poll retransmission timer; receiving a status report from the second wireless node, the status report including a negative acknowledgment sequence number and an acknowledgment sequence number, the negative acknowledgment sequence number being greater than the acknowledgment sequence number; and based on the negative acknowledgment sequence number being equal to or greater than the polling sequence number, reinstating the poll retransmission timer.

Example 2. According to an example aspect of the method of Example 1, the multiple sequence numbers can be sequential.

Example 3. According to an example aspect of the method of any of Examples 1 or 2, the negative acknowledgment sequence number can be greater than the polling sequence number.

Example 4. According to an example aspect of the method of any of Examples 1 or 2, the negative acknowledgment sequence number can be equal to the polling sequence number.

Example 5. According to an example aspect of the method of any of Examples 1-4, the reinstating the poll retransmission timer can comprise stopping and resetting the poll retransmission timer.

Example 6. According to an example aspect of the method of any of Examples 1-5, the reinstating the poll retransmission timer can comprise restarting the poll retransmission timer.

Example 7. According to an example aspect of the method of any of Examples 1-6, the method can further include, in response to the poll retransmission timer expiring and based on a queue of new packets to send to the second wireless node being empty, resending at least one of the multiple packets to the second wireless node.

Example 8. According to an example aspect of the method of any of Examples 1-7, the method can further include, in response to the poll retransmission timer expiring, sending a subsequent poll to the second wireless node.

Example 9. According to an example aspect of the method of any of Examples 1-8, the method can further include the negative acknowledgment sequence number is equal to the polling number; and the status report can further include an indicator indicating that a packet with a sequence number equal to the negative acknowledgment sequence number shall not be retransmitted.

Example 10. According to an example aspect of the method of any of Examples 1-9, the method can further include the negative acknowledgment sequence number is equal to the polling sequence number; and the status report further includes a first special value for a first indicator of a beginning of a lost portion of data and a second special value for a second indicator of an end of the lost portion of data.

Example 11. According to an example aspect of the method of Example 10, the first indicator can comprise an SOstart field and the second indicator can comprise an SOend field.

Example 12. According to an example aspect of the method of Example 10, the first indicator can be different than the second indicator.

Example 13. According to an example aspect of the method of any of Examples 1-12, the negative acknowledgment sequence number is equal to the polling sequence number; and the status report further includes an indicator indicating that a packet with a sequence equal to the negative acknowledgment sequence number shall not be retransmitted.

Example 14. According to an example aspect of the method of Example 13, the indicator can comprise a special value for SOstart and another special value for SOend.

Example 15. According to an example aspect of the method of any of Examples 1-14, the reinstating the poll retransmission timer can be based on the negative acknowledgment sequence number being equal to the polling sequence number.

Example 16. According to an example aspect of the method of any of Examples 1-15, the reinstating the poll retransmission timer can be based on the negative acknowledgment sequence number being greater than the polling sequence number.

Example 17. According to an example aspect of the method of any of Examples 1-16, the method can further comprise, in response to the poll retransmission timer expiring and based on having no new packets to send to the wireless node, resending at least one of the multiple packets to the second wireless node.

Example 18. According to an example aspect of the method of any of Examples 1-17, the method can further comprise, in response to the poll retransmission timer expiring, sending a subsequent poll to the second wireless node.

Example 19. According to an example aspect of the method of any of Examples 1-18, the negative acknowledgment sequence number can be equal to the polling sequence number; and the negative acknowledgment sequence number being equal to the polling sequence number can indicate that a packet of the multiple packets with a highest sequence number was a last packet received by the second wireless node from the first wireless node.

Example 20. A method can include sending, by a first wireless node to a second wireless node, multiple packets, the multiple packets being associated with multiple sequence numbers; and receiving, from the second wireless node, a protocol sequence number, the protocol sequence number indicating a highest sequence number of packets received by a third wireless node, the third wireless node being subordinate to the second wireless node.

Example 21. According to an example aspect of the method of any of Example 20, the protocol sequence number can be included in a status report, the status report further including an acknowledgment sequence number, the acknowledgment sequence number identifying a next sequence number not reported as missing by the status report.

Example 22. According to an example aspect of the method of any of Examples 20-21, the protocol sequence number can be included in a control packet (RLC control PDU).

Example 23. According to an example aspect of the method of any of Examples 20-22, the method can further include sending a poll to the second wireless node, the poll requesting indications of whether the multiple packets were successfully received, the protocol sequence number being received in response to the poll.

Example 24. According to an example aspect of the method of any of Examples 20-23, the protocol sequence number can indicate a highest sequence number of packets received by a third wireless node, the third wireless node being subordinate to the second wireless node.

Example 25. According to an example aspect of the method of any of Examples 20-24, the packet can be an RLC SDU and the upper layer protocol can be PDCP.

Example 26. A user equipment can comprise at least one processor; and a non-transitory computer-readable storage medium comprising instructions stored thereon that, when executed by the at least one processor, are configured to cause the user equipment to perform the method of any of examples 1-19.

Example 27. A user equipment can comprise at least one processor; and a non-transitory computer-readable storage medium comprising instructions stored thereon that, when executed by the at least one processor, are configured to cause the user equipment to perform the method of any of examples 20-25.

Example 28. A non-transitory computer-readable storage medium can comprise instructions stored thereon that, when executed by the at least one processor, are configured to cause a user equipment to perform the method of any of examples 1-19.

Example 29. A non-transitory computer-readable storage medium comprising instructions stored thereon that, when executed by the at least one processor, are configured to cause a user equipment to perform the method of any of examples 20-25.

Example 30. A method can comprise receiving, by an intermediate node from a user equipment, multiple packets, the multiple packets being associated with multiple sequence numbers; receiving a poll from the user equipment, the poll requesting indications of whether the multiple packets were successfully received; and sending a status report to the user equipment, the status report including a negative acknowledgment sequence number, an acknowledgment sequence number, and an indicator, the negative acknowledgment sequence number being greater than the acknowledgment sequence number, the indicator indicating that a packet with a sequence number equal to the negative acknowledgment sequence number should not be retransmitted.

Example 31. A non-transitory computer-readable storage medium can comprise instructions stored thereon that, when executed by at least one processor, are configured to cause an intermediate node to receive, from a user equipment, multiple packets, the multiple packets being associated with multiple sequence numbers; receive a poll from the user equipment, the poll requesting indications of whether the multiple packets were successfully received; and send a status report to the user equipment, the status report including a negative acknowledgment sequence number, an acknowledgment sequence number, and an indicator, the negative acknowledgment sequence number being greater than the acknowledgment sequence number, the indicator indicating that a packet with a sequence number equal to the negative acknowledgment sequence number should not be retransmitted.

Example 32. An intermediate node can comprise at least one processor and a non-transitory computer-readable storage medium comprising instructions stored thereon that, when executed by the at least one processor, are configured to cause an intermediate node to receive, from a user equipment, multiple packets, the multiple packets being associated with multiple sequence numbers; receive a poll from the user equipment, the poll requesting indications of whether the multiple packets were successfully received; and send a status report to the user equipment, the status report including a negative acknowledgment sequence number, an acknowledgment sequence number, and an indicator, the negative acknowledgment sequence number being greater than the acknowledgment sequence number, the indicator indicating that a packet with a sequence number equal to the negative acknowledgment sequence number should not be retransmitted.

Example 33. According to any of Examples 1-32, the indicator and/or status report can further a first special value for a first indicator of a beginning of a lost portion of data and a second special value for a second indicator of an end of the lost portion of data Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
sending, by a first wireless node to a second wireless node, multiple packets, the multiple packets being associated with multiple sequence numbers;
sending a poll to the second wireless node, the poll requesting indications of whether the multiple packets were successfully received;
setting a polling sequence number to a highest sequence number associated with the multiple packets sent by the first wireless node when the first wireless node sent the poll;
starting a poll retransmission timer;
receiving a status report from the second wireless node, the status report including a negative acknowledgment sequence number and an acknowledgment sequence number, the negative acknowledgment sequence number being greater than the acknowledgment sequence number; and reinstating the poll retransmission timer based on:
the negative acknowledgment sequence number being greater than the polling sequence number; or
the negative acknowledgment sequence number being equal to the polling sequence number, wherein:
the status report further includes an indicator indicating that a packet with a sequence number equal to the negative acknowledgment sequence number shall not be retransmitted;
the status report further includes a first special value for a first indicator of a beginning of a lost portion of data and a second special value for a second indicator of an end of the lost portion of data; or
the negative acknowledgment sequence number being equal to the polling sequence number indicates that a packet of the multiple packets with a highest sequence number was a last packet received by the second wireless node from the first wireless node.

2. The method of claim 1, wherein the multiple sequence numbers are sequential.

3. The method of claim 1, wherein the reinstating the poll retransmission timer comprises stopping and resetting the poll retransmission timer.

4. The method of claim 1, wherein the reinstating the poll retransmission timer comprises restarting the poll retransmission timer.

5. The method of claim 1, further comprising, in response to the poll retransmission timer expiring and based on a queue of new packets to send to the second wireless node being empty, resending at least one of the multiple packets to the second wireless node.

6. The method of claim 1, further comprising, in response to the poll retransmission timer expiring, sending a subsequent poll to the second wireless node.

7. The method of claim 1, wherein when the negative acknowledgment sequence number is equal to the polling sequence number and the status report further includes a first special value for a first indicator of a beginning of a lost portion of data and a second special value for a second indicator of an end of the lost portion of data, the first indicator comprises an SOstart field and the second indicator comprises an SOend field.

8. The method of claim 1, wherein when the negative acknowledgment sequence number is equal to the polling sequence number and the status report further includes a first special value for a first indicator of a beginning of a lost portion of data and a second special value for a second indicator of an end of the lost portion of data, the first indicator is different than the second indicator.

9. The method of claim 1, wherein when the negative acknowledgment sequence number is equal to the polling sequence number and the status report further includes an indicator indicating that a packet with a sequence number equal to the negative acknowledgment sequence number shall not be retransmitted, the indicator comprises a special value for SOstart and another special value for SOend.

10. The method of claim 1, further comprising, in response to the poll retransmission timer expiring and based on having no new packets to send to the second wireless node, resending at least one of the multiple packets to the second wireless node.

11. The method of claim 1, further comprising, in response to the poll retransmission timer expiring, sending a subsequent poll to the second wireless node.

12. A user equipment comprising:
at least one processor; and
a non-transitory computer-readable storage medium comprising instructions stored thereon that, when executed by the at least one processor, are configured to cause the user equipment to:
send, to an intermediate node, multiple packets, the multiple packets being associated with multiple sequence numbers;
send a poll to the intermediate node, the poll requesting indications of whether the multiple packets were successfully received;
set a polling sequence number to a highest sequence number associated with the multiple packets sent by the user equipment when the user equipment sent the poll;
start a poll retransmission timer;
receive a status report from the intermediate node, the status report including a negative acknowledgment sequence number and an acknowledgment sequence number, the negative acknowledgment sequence number being greater than the acknowledgment sequence number; and
reinstating the poll retransmission timer based on:
the negative acknowledgment sequence number being greater than the polling sequence number; or
the negative acknowledgment sequence number being equal to the polling sequence number, wherein:
the status report further includes an indicator indicating that a packet with a sequence number equal to the negative acknowledgment sequence number shall not be retransmitted;
the status report further includes a first special value for a first indicator of a beginning of a lost portion of data and a second special value for a second indicator of an end of the lost portion of data; or
the negative acknowledgment sequence number being equal to the polling sequence number indicates that a packet of the multiple packets with a highest sequence number was a last packet received by the intermediate node from the user equipment.

13. The user equipment of claim 12, wherein when the negative acknowledgment sequence number is equal to the polling sequence number and the status report further includes a first special value for a first indicator of a beginning of a lost portion of data and a second special value for a second indicator of an end of the lost portion of data, the first indicator comprises an SOstart field and the second indicator comprises an SOend field.

14. The user equipment of claim 12, wherein when the negative acknowledgment sequence number is equal to the polling sequence number and the status report further includes a first special value for a first indicator of a beginning of a lost portion of data and a second special value for a second indicator of an end of the lost portion of data, the first indicator is different than the second indicator.

15. The user equipment of claim 12, wherein when the negative acknowledgment sequence number is equal to the polling sequence number and the status report further includes an indicator indicating that a packet with a sequence number equal to the negative acknowledgment sequence number shall not be retransmitted, the indicator comprises a special value for SOstart and another special value for SOend.

16. The user equipment of claim 12, wherein the instructions are further configured to cause the user equipment to, in response to the poll retransmission timer expiring and based on having no new packets to send to the intermediate node, resend at least one of the multiple packets to the intermediate node.

17. A non-transitory computer-readable storage medium comprising instructions stored thereon that, when executed by at least one processor, are configured to cause a user equipment to:
  send, to an intermediate node, multiple packets, the multiple packets being associated with multiple sequence numbers;
  send a poll to the intermediate node, the poll requesting indications of whether the multiple packets were successfully received;
  set a polling sequence number to a highest sequence number associated with the multiple packets sent by the user equipment when the user equipment sent the poll;
  start a poll retransmission timer;
  receive a status report from the intermediate node, the status report including a negative acknowledgment sequence number and an acknowledgment sequence number, the negative acknowledgment sequence number being greater than the acknowledgment sequence number; and
  reinstate the poll retransmission timer based on:
    the negative acknowledgment sequence number being greater than the polling sequence number; or
    the negative acknowledgment sequence number being equal to the polling sequence number, wherein:
      the status report further includes an indicator indicating that a packet with a sequence number equal to the negative acknowledgment sequence number shall not be retransmitted;
      the status report further includes a first special value for a first indicator of a beginning of a lost portion of data and a second special value for a second indicator of an end of the lost portion of data; or
      the negative acknowledgment sequence number being equal to the polling sequence number indicates that a packet of the multiple packets with a highest sequence number was a last packet received by the intermediate node from the user equipment.

18. The non-transitory computer-readable storage medium of claim 17, wherein when the negative acknowledgment sequence number is equal to the polling sequence number and the status report further includes a first special value for a first indicator of a beginning of a lost portion of data and a second special value for a second indicator of an end of the lost portion of data, the first indicator comprises an SOstart field and the second indicator comprises an SOend field.

19. The non-transitory computer-readable storage medium of claim 17, wherein when the negative acknowledgment sequence number is equal to the polling sequence number and the status report further includes a first special value for a first indicator of a beginning of a lost portion of data and a second special value for a second indicator of an end of the lost portion of data, the first indicator is different than the second indicator.

20. The non-transitory computer-readable storage medium of claim 17, wherein when the negative acknowledgment sequence number is equal to the polling sequence number and the status report further includes an indicator indicating that a packet with a sequence number equal to the negative acknowledgment sequence number shall not be retransmitted, the indicator comprises a special value for SOstart and another special value for SOend.

21. The non-transitory computer-readable storage medium of claim 17, wherein the instructions are further configured to cause the user equipment to, in response to the poll retransmission timer expiring and based on having no new packets to send to the intermediate node, resend at least one of the multiple packets to the intermediate node.

* * * * *